(12) United States Patent
Feijen et al.

(10) Patent No.: US 8,992,124 B2
(45) Date of Patent: Mar. 31, 2015

(54) MARINE PIPELAYING SYSTEM AND METHOD

(75) Inventors: Arnoud Laurens Feijen, Rotterdam (NL); Ronny Lambertus Waltherus Nouwens, Schiedam (NL); Diederick Bernardus Wijning, Schiedam (NL); Joop Roodenburg, Delft (NL)

(73) Assignee: ITREC B.V., Schiedam (NL)

( * ) Notice: Subject to any disclaimer, the term of this patent is extended or adjusted under 35 U.S.C. 154(b) by 460 days.

(21) Appl. No.: 12/990,034

(22) PCT Filed: Apr. 27, 2009

(86) PCT No.: PCT/NL2009/000106
§ 371 (c)(1),
(2), (4) Date: Jan. 11, 2011

(87) PCT Pub. No.: WO2009/134124
PCT Pub. Date: Nov. 5, 2009

(65) Prior Publication Data
US 2011/0103894 A1  May 5, 2011

Related U.S. Application Data

(60) Provisional application No. 61/071,449, filed on Apr. 29, 2008.

(51) Int. Cl.
| | |
|---|---|
| *F16L 1/19* | (2006.01) |
| *F16L 1/225* | (2006.01) |
| *F16L 1/15* | (2006.01) |
| *F16L 57/02* | (2006.01) |
| *F16L 1/16* | (2006.01) |
| *F16L 1/26* | (2006.01) |

(Continued)

(52) U.S. Cl.
CPC . *F16L 1/225* (2013.01); *F16L 1/19* (2013.01); *F16L 1/20* (2013.01); *B63B 35/03* (2013.01)
USPC ............. 405/166; 405/168.1; 405/168.2; 405/169; 405/170

(58) Field of Classification Search
USPC .............. 405/166, 168.1, 168.2, 169, 170
See application file for complete search history.

(56) References Cited

U.S. PATENT DOCUMENTS

| 1,220,187 | A | * | 3/1917 | Chapman | 405/166 |
| 1,393,943 | A | * | 10/1921 | Chapman | 405/166 |
| 1,569,764 | A | * | 1/1926 | Lockwood | 405/166 |

(Continued)

FOREIGN PATENT DOCUMENTS

| EP | 0 094 698 A1 | 11/1983 |
| WO | 2004/085898 A1 | 10/2004 |

(Continued)

*Primary Examiner* — Benjamin Fiorello
*Assistant Examiner* — Edwin Toledo-Duran
(74) *Attorney, Agent, or Firm* — Birch, Stewart, Kolasch & Birch, LLP

(57) ABSTRACT

The invention relates to a marine pipelaying system comprising a vessel (1) provided with a pipeline launch tower (6). The tower (6) comprises pipe laying equipment defining a tower firing line, and is adapted for launching a pipeline (20) along the firing line into the sea. The system furthermore comprises a hang off module (15) supported in the lower part of the firing line for clamping and supporting the weight of previously launched pipeline (20) as well as a stinger for guiding the launched pipeline (20). The stinger (10) is supported at its upper end in the lower part of the firing line. The stinger is displaceable from the firing line.

28 Claims, 27 Drawing Sheets

Figure 1:
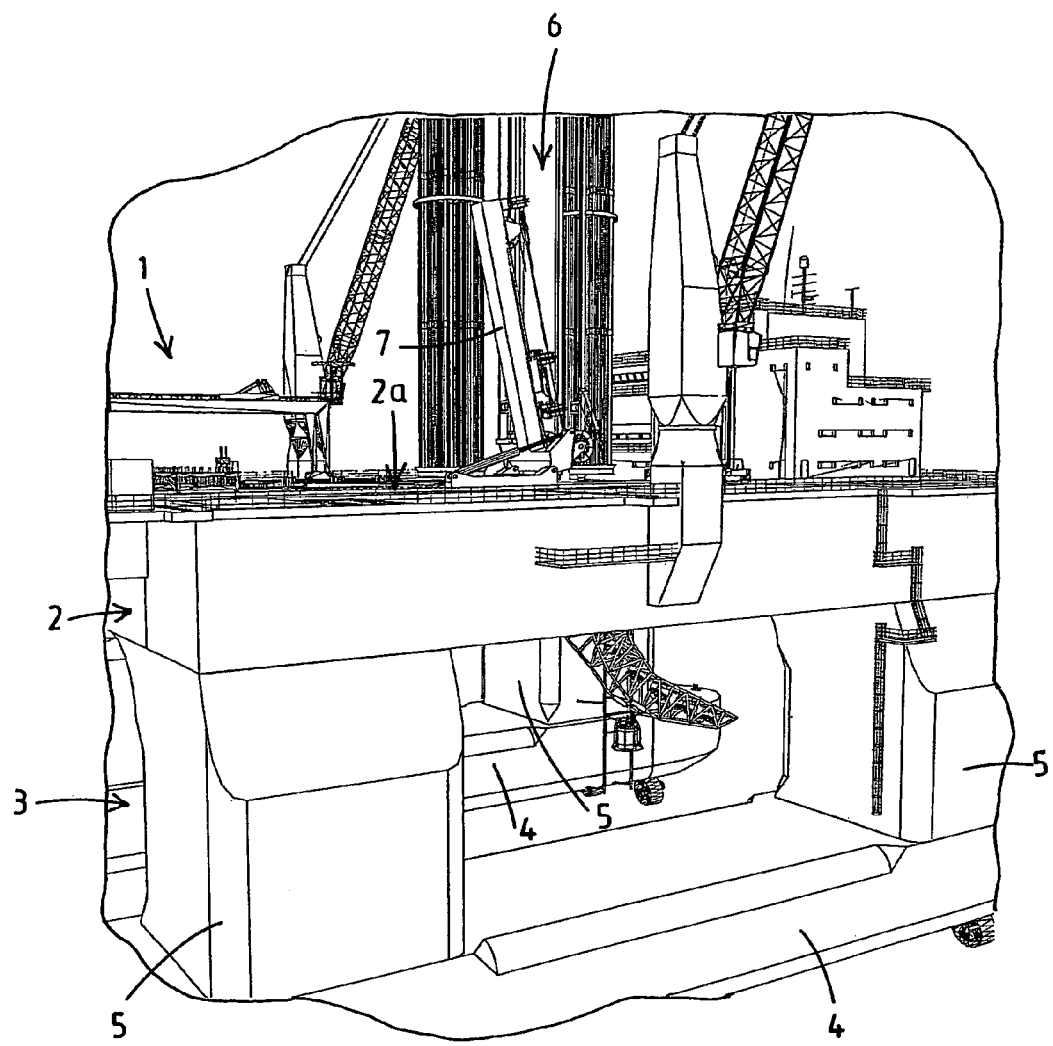

(51) Int. Cl.
*F16L 1/20* (2006.01)
*B63B 35/03* (2006.01)

(56) References Cited

U.S. PATENT DOCUMENTS

| | | | | |
|---|---|---|---|---|
| 2,215,460 | A * | 9/1940 | Childress | 193/35 R |
| 2,931,185 | A * | 4/1960 | Ashby | 242/157 R |
| 3,266,256 | A * | 8/1966 | Postlewaite et al. | 405/166 |
| 3,462,963 | A * | 8/1969 | Moore | 405/164 |
| 3,472,034 | A * | 10/1969 | Lawrence | 405/166 |
| 3,491,541 | A * | 1/1970 | Berard | 405/166 |
| 3,508,409 | A * | 4/1970 | Cargile, Jr. | 405/195.1 |
| 3,581,506 | A * | 6/1971 | Howard | 405/166 |
| 3,585,806 | A * | 6/1971 | Lawrence | 405/166 |
| 3,589,136 | A * | 6/1971 | Sorenson et al. | 405/166 |
| 3,670,511 | A * | 6/1972 | Gibson et al. | 405/166 |
| 3,680,322 | A * | 8/1972 | Nolan et al. | 405/166 |
| 3,685,305 | A * | 8/1972 | Lloyd, III | 405/166 |
| 3,736,760 | A * | 6/1973 | Carstens et al. | 405/166 |
| 3,739,590 | A * | 6/1973 | Whitfield, Jr. | 405/166 |
| 3,822,559 | A * | 7/1974 | Matthews et al. | 405/166 |
| 3,884,043 | A * | 5/1975 | Timmermans | 405/166 |
| 3,901,043 | A * | 8/1975 | Silvestri et al. | 405/167 |
| 3,922,870 | A * | 12/1975 | Recalde | 405/166 |
| 3,924,415 | A * | 12/1975 | Goren et al. | 405/166 |
| RE28,922 | E * | 8/1976 | Lloyd, III | 405/166 |
| 3,990,259 | A * | 11/1976 | Gunderson et al. | 405/166 |
| RE29,591 | E * | 3/1978 | Lloyd | 405/166 |
| 4,243,345 | A * | 1/1981 | Cha et al. | 405/168.3 |
| 4,433,938 | A * | 2/1984 | Boon | 405/166 |
| 4,472,079 | A * | 9/1984 | Langner | 405/167 |
| 4,486,123 | A * | 12/1984 | Koch et al. | 405/169 |
| 4,591,294 | A * | 5/1986 | Foulkes | 405/170 |
| 4,714,379 | A * | 12/1987 | Gilchrist, Jr. | 405/163 |
| 4,789,108 | A * | 12/1988 | Recalde | 242/388.7 |
| 4,865,359 | A * | 9/1989 | Roberts | 285/94 |
| 5,011,333 | A * | 4/1991 | Lanan | 405/166 |
| 5,421,675 | A * | 6/1995 | Brown et al. | 405/170 |
| 5,464,307 | A * | 11/1995 | Wilkins | 405/166 |
| 5,533,834 | A * | 7/1996 | Recalde | 405/168.3 |
| 5,797,702 | A * | 8/1998 | Drost et al. | 405/166 |
| 6,213,686 | B1 * | 4/2001 | Baugh | 405/166 |
| 6,273,643 | B1 * | 8/2001 | Baugh | 405/166 |
| 6,293,732 | B1 * | 9/2001 | Baugh | 405/170 |
| 6,334,739 | B1 * | 1/2002 | Baugh | 405/166 |
| 6,352,388 | B1 * | 3/2002 | Seguin | 405/166 |
| 6,361,250 | B1 * | 3/2002 | de Varax | 405/158 |
| 6,524,030 | B1 * | 2/2003 | Giovannini et al. | 405/166 |
| 6,592,297 | B2 * | 7/2003 | Frijns et al. | 405/170 |
| 6,715,963 | B2 * | 4/2004 | Kuppers | 405/166 |
| 6,732,762 | B2 * | 5/2004 | Russell | 138/89 |
| 6,733,208 | B2 * | 5/2004 | Stockstill | 405/169 |
| 7,255,515 | B2 * | 8/2007 | Roodenburg et al. | 405/166 |
| 2001/0041095 | A1 * | 11/2001 | Baugh | 405/166 |
| 2002/0006314 | A1 * | 1/2002 | Willis | 405/168.2 |
| 2002/0092455 | A1 * | 7/2002 | Kellogg et al. | 114/265 |
| 2005/0207849 | A1 * | 9/2005 | Roodenburg et al. | 405/166 |
| 2007/0084816 | A1 * | 4/2007 | Roodenburg et al. | 212/270 |

FOREIGN PATENT DOCUMENTS

| | | |
|---|---|---|
| WO | 2006/085739 A1 | 8/2006 |
| WO | 2007/073146 A1 | 6/2007 |

* cited by examiner

MARINE PIPELAYING SYSTEM AND METHOD

This application is the National Phase of PCT/NL2009/000106 filed on Apr. 27, 2009, which claims priority under 35 USC 119(e) to U.S. Provisional Application No. 61/071,449 filed on Apr. 29, 2008, the entire contents of which is hereby incorporated by reference into the present application.

The present invention relates to laying of an offshore pipeline. In offshore pipelaying several laying techniques are available. One of those techniques is referred to as the J-lay technique. In this technique pipe sections are added to the previously launched pipeline in a vertical or near vertical orientation.

Many designs for J-lay pipelaying devices are known in the art. These designs comprise in general a launch tower including pipe laying equipment defining a firing line. The pipe laying equipment may include one or more welding stations, a line-up tool, etc.

A hang off module, often embodied as a clamp, is commonly arranged at or near the lower end of the tower for holding the launched pipeline. During pipelaying the lower end of the new pipe section is connected to the upper end of the previously launched pipeline. After the new pipe section is connected to the previously launched pipeline—usually by welding—the hang off clamp is released and the pipeline is lowered by suitable lowering means, e.g. including a travel block, one or more lowering wires and one or more associated winches. Next, the hang off clamp engages again on the launched pipeline, the travel block is released and moved upwardly after which a new pipe section can be connected to the pipeline.

The launch tower is in many designs pivotable such that it can launch the pipeline under an angle with the vertical. Also designs where the launch tower is fixed in an upright vertical position, thus non-pivotable, are known in the art.

In the art of pipelaying a stinger is also known. In a known design the stinger is fitted to the lower end of the tower or to the hull of the vessel. The stinger in general serves to provide guidance and/or support for the pipeline. An example thereof is found in EP 0 094 698.

In practice it is often desirable to connect to the upper end of the already launched pipeline a so called accessory, such as an inline structure (ILS) or a pipeline end terminal (PLET). Such accessories have in general dimensions deviating significantly from a common pipe section.

It has been found that stinger equipped pipelaying systems are rather unpractical when it is desired to lay pipeline provided with one or more accessories.

The present invention has for an object to provide a pipe laying system and method which allows launching of a pipeline via a stinger, wherein the pipeline can be provided with accessories.

The invention provides a marine pipelaying vessel for laying an offshore pipeline, the vessel comprising:
- a pipeline launch tower comprising pipe laying equipment,
- a hang off module for supporting the weight of previously launched pipeline,
- a stinger for guiding the launched pipeline generally below the hang off module, said stinger being supported at its upper end by a stinger support assembly, wherein the stinger support assembly is adapted to allow for displacement of the stinger to a remote non-active position.

The displacement of the stinger to a remote non-active position, away from its operational position during pipelaying of the pipeline, e.g. allows for the unhindered passage of an accessory when such an accessory has been fitted to the upper end of the launched pipeline at an earlier stage.

In a method according to the invention for laying an offshore pipeline provided with an accessory using the above marine pipelaying system, said system comprising an accessory handling system for positioning in the firing line an accessory which is to be connected to the already launched pipeline, the method comprises the following steps:
- launching the pipeline in the tower firing line into the sea via the stinger,
- stopping the launch of pipeline, and hanging off the launched pipeline in the hang off module,
- positioning the accessory in the firing line by means of the accessory handling system,
- attaching the accessory to the launched pipeline in the hang off module and to the lowering means,
- releasing the hang off module from the launched pipeline and suspending the accessory and the launched pipeline from the lowering means,
- displacing the stinger out of the firing line,
- displacing the hang off module out of the firing line,
- lowering the accessory with the launched pipeline by the lowering means beyond the position of the hang off module in the firing line,
- repositioning the hang off module in the firing line,
- hanging off the launched pipeline with accessory in the hang off module.

Preferably the stinger is translatable, e.g. skiddable, to its remote non-active position.

In a particularly preferred embodiment of the pipelaying system, the stinger at its upper end is pivotable about a horizontal axis such that it is liftable between an uppermost position and a lowermost position. It is also consider advantageous if the stinger is rotatable about a vertical axis.

As will follow from the claims and the description the stinger is translatable, pivotable up and down and also rotatable about a vertical axis.

Preferably the hang off module and the stinger are mounted to a common, moveable support member.

Further details of the invention will described in the following description with reference to the drawing.

Figure 2:
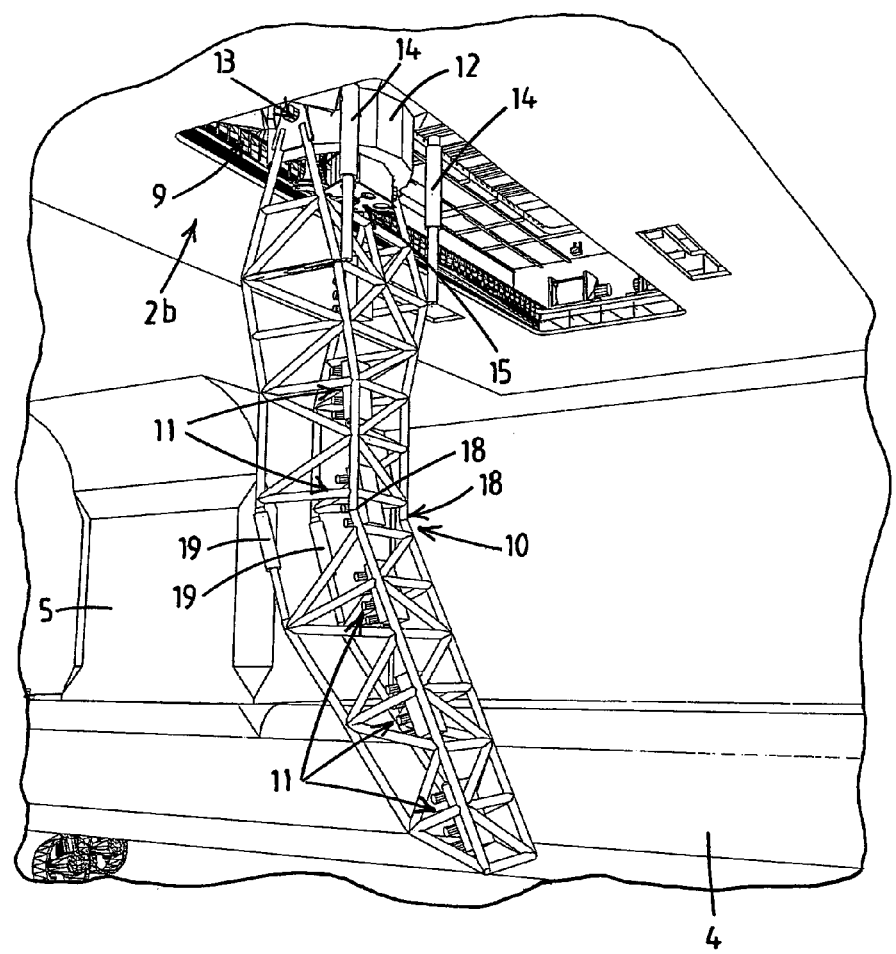
Figure 3:
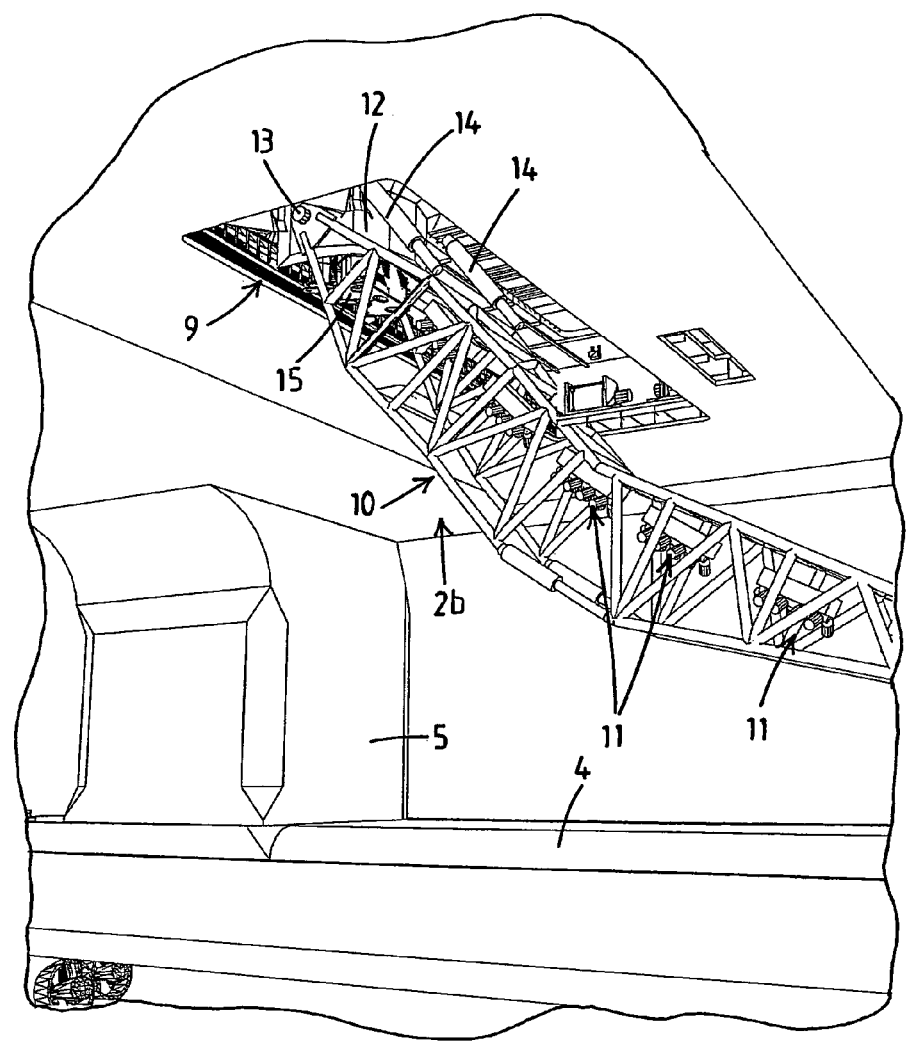
Figure 4:
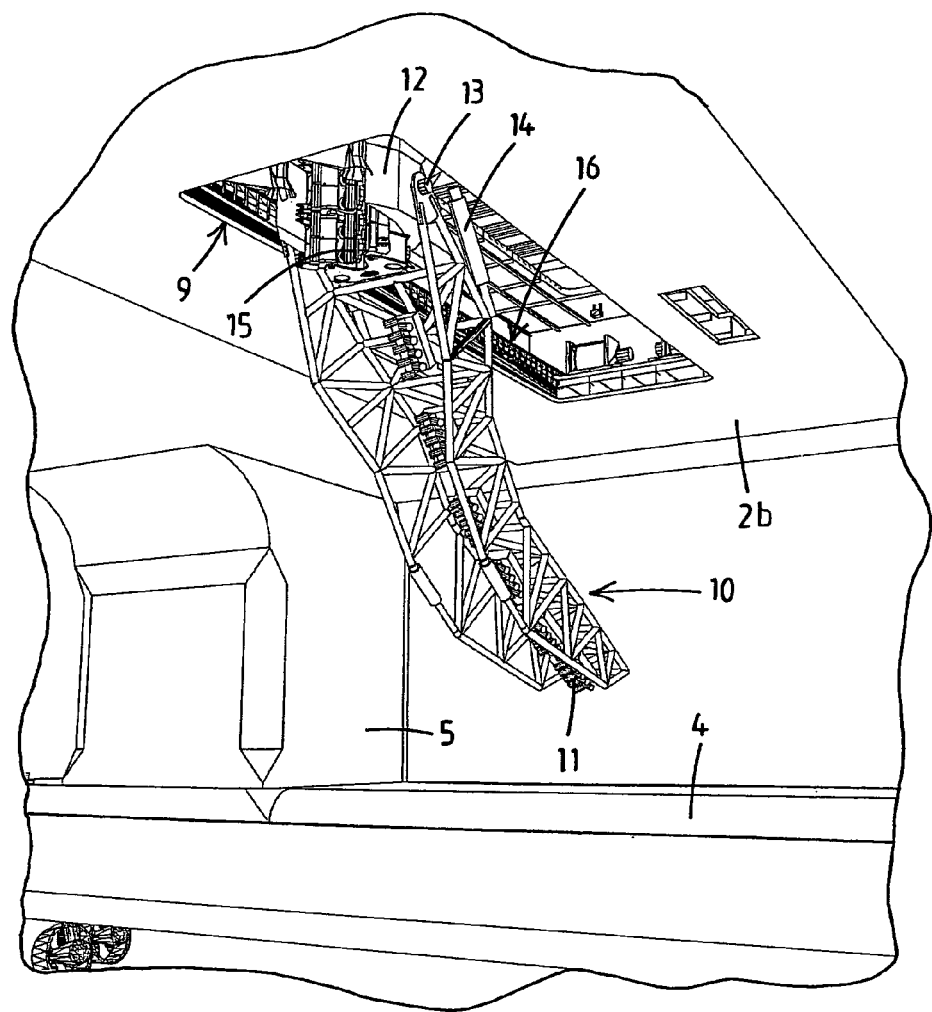
Figure 5:
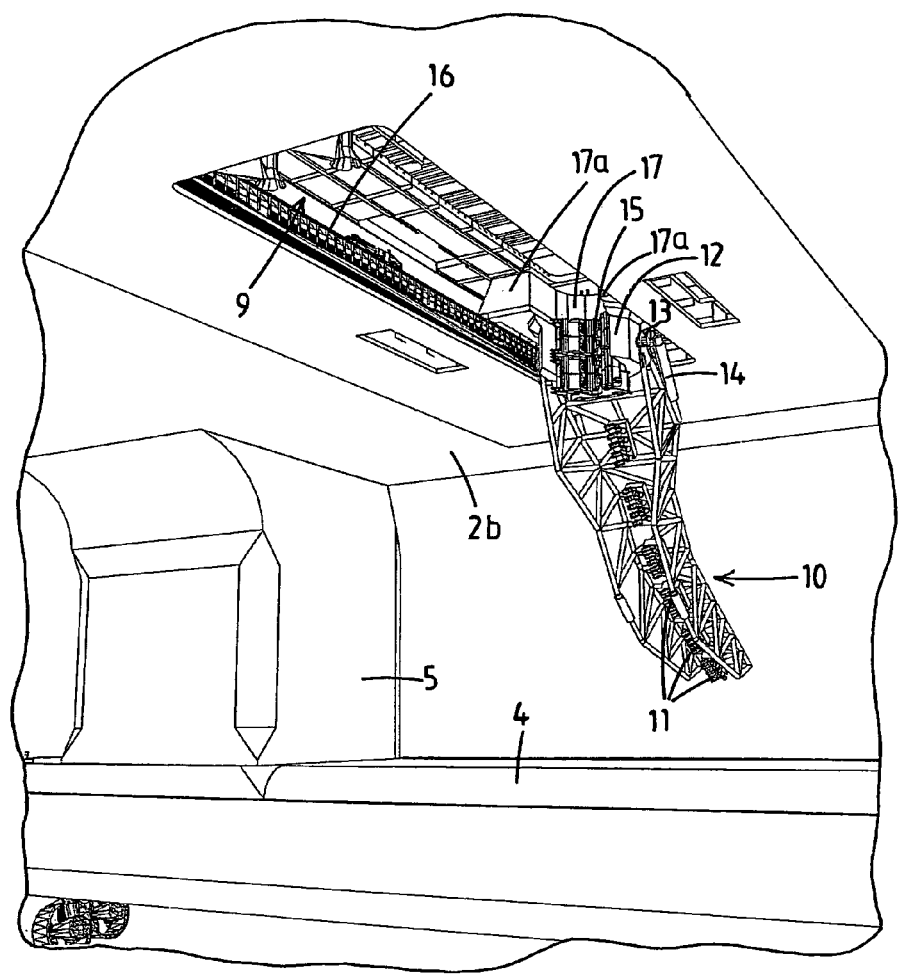
Figure 6:
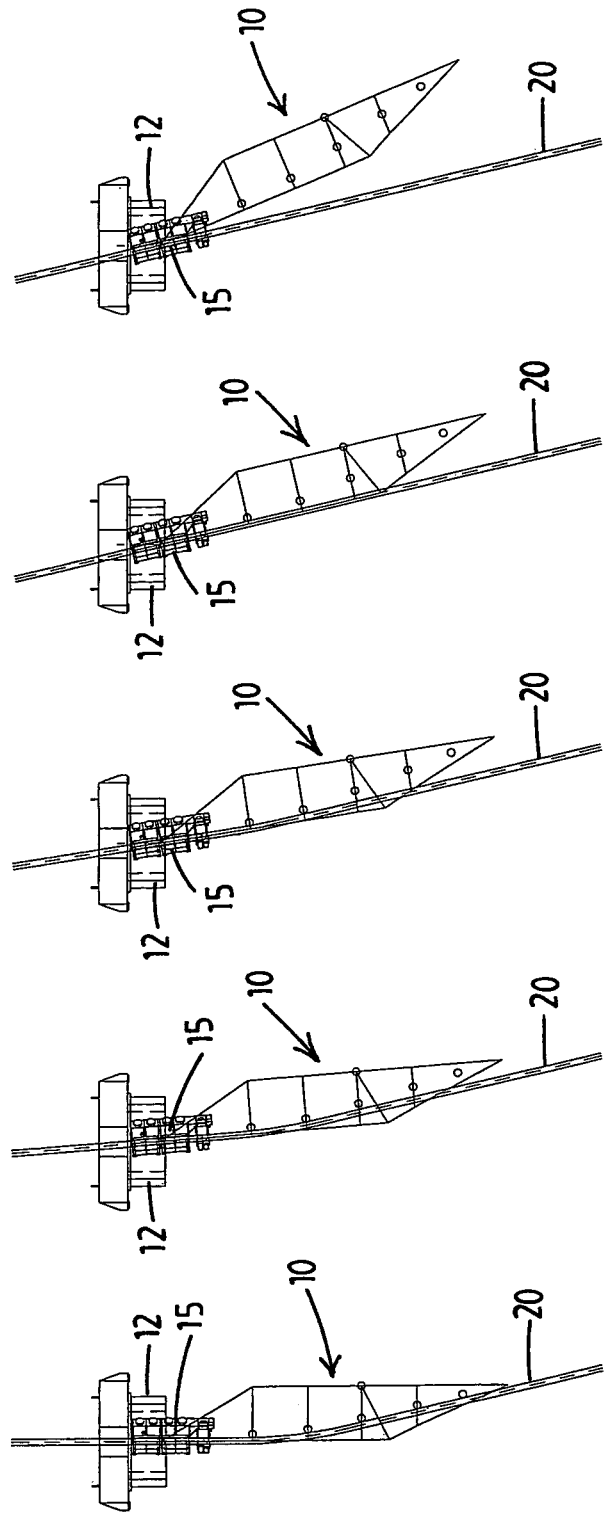
Figure 7:
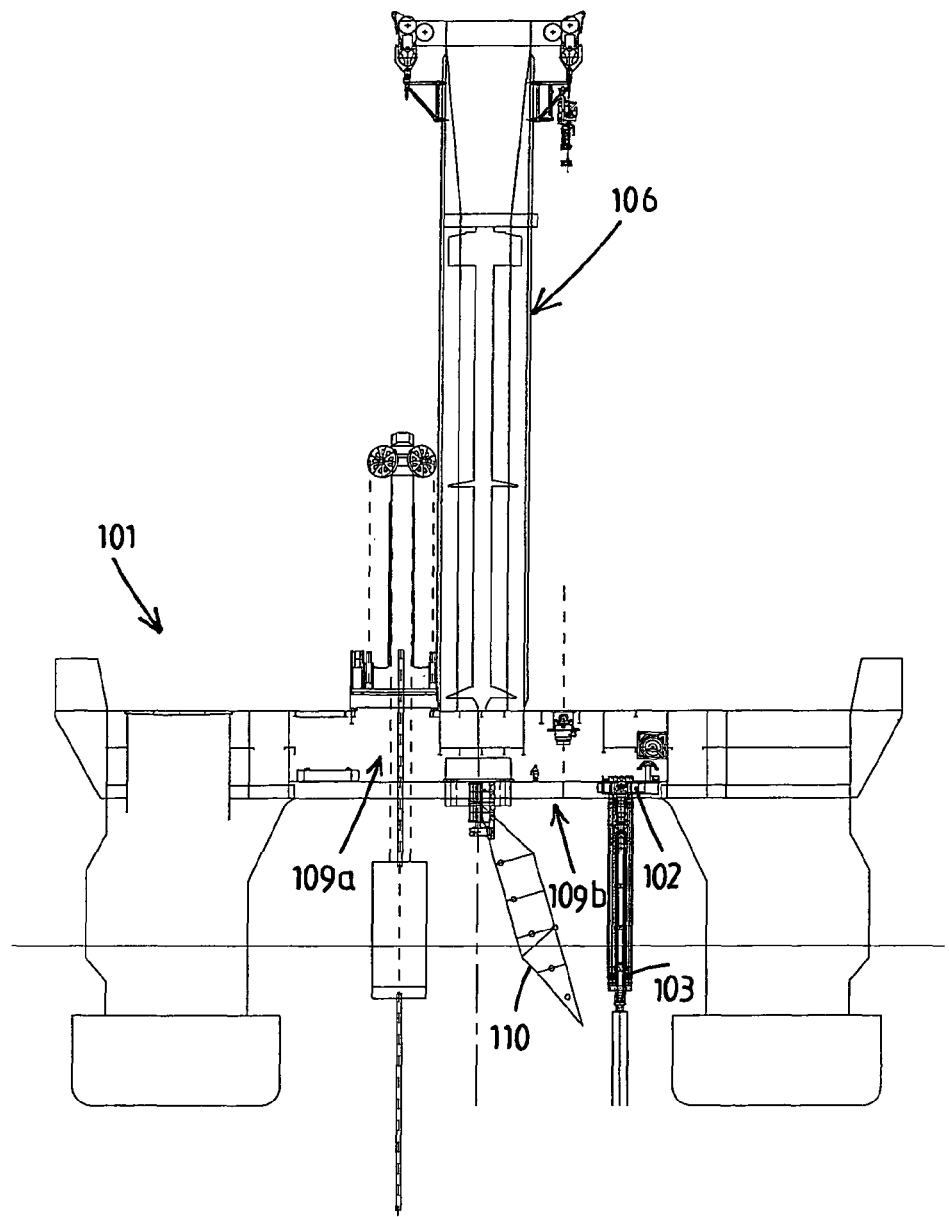
Figure 8A:
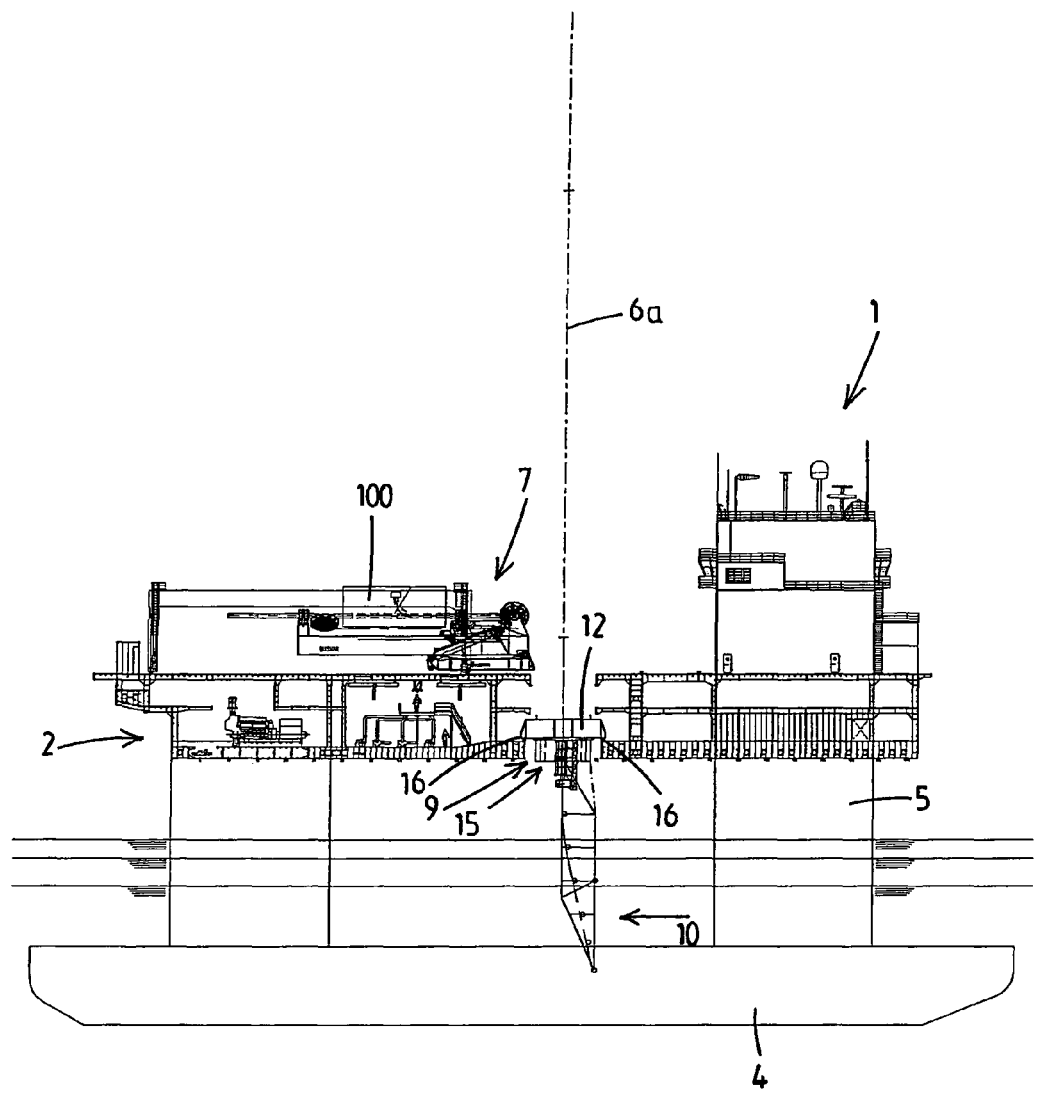
Figure 8B:
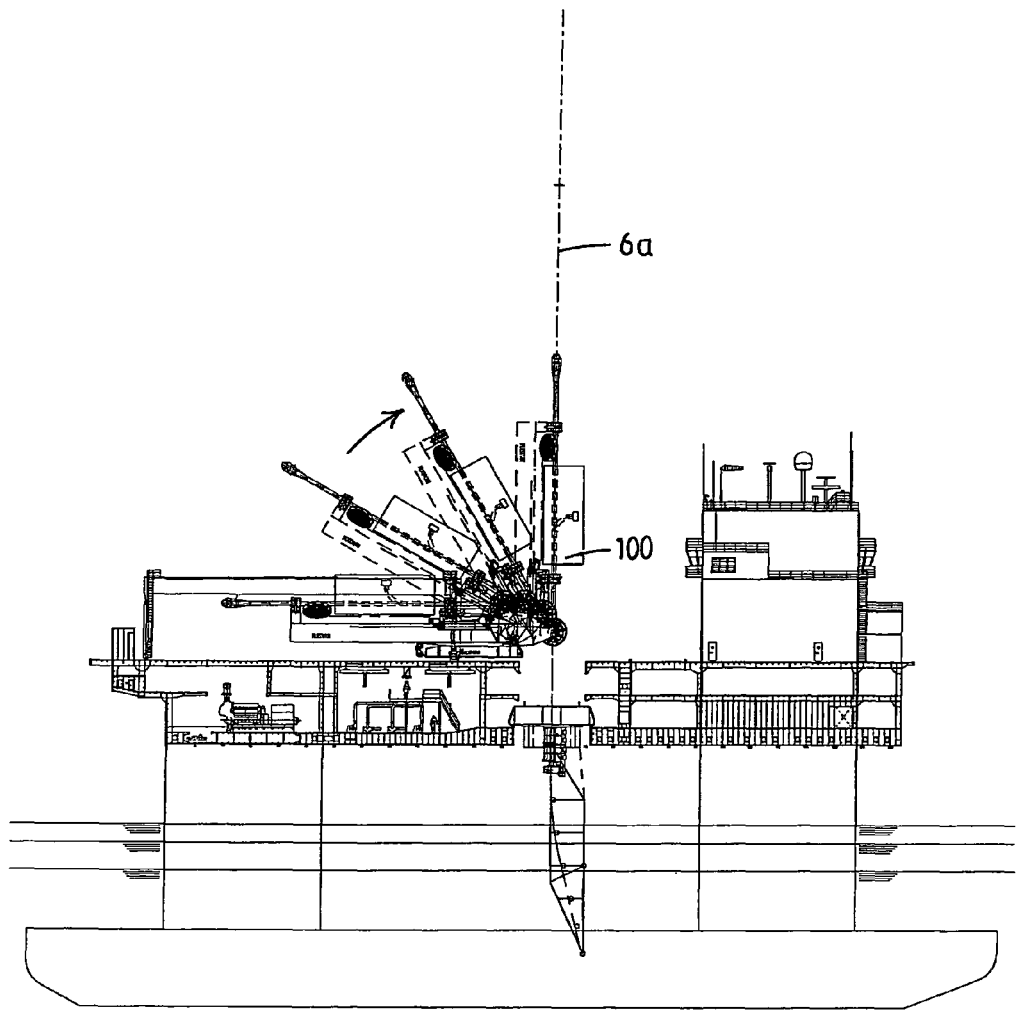
Figure 8C:
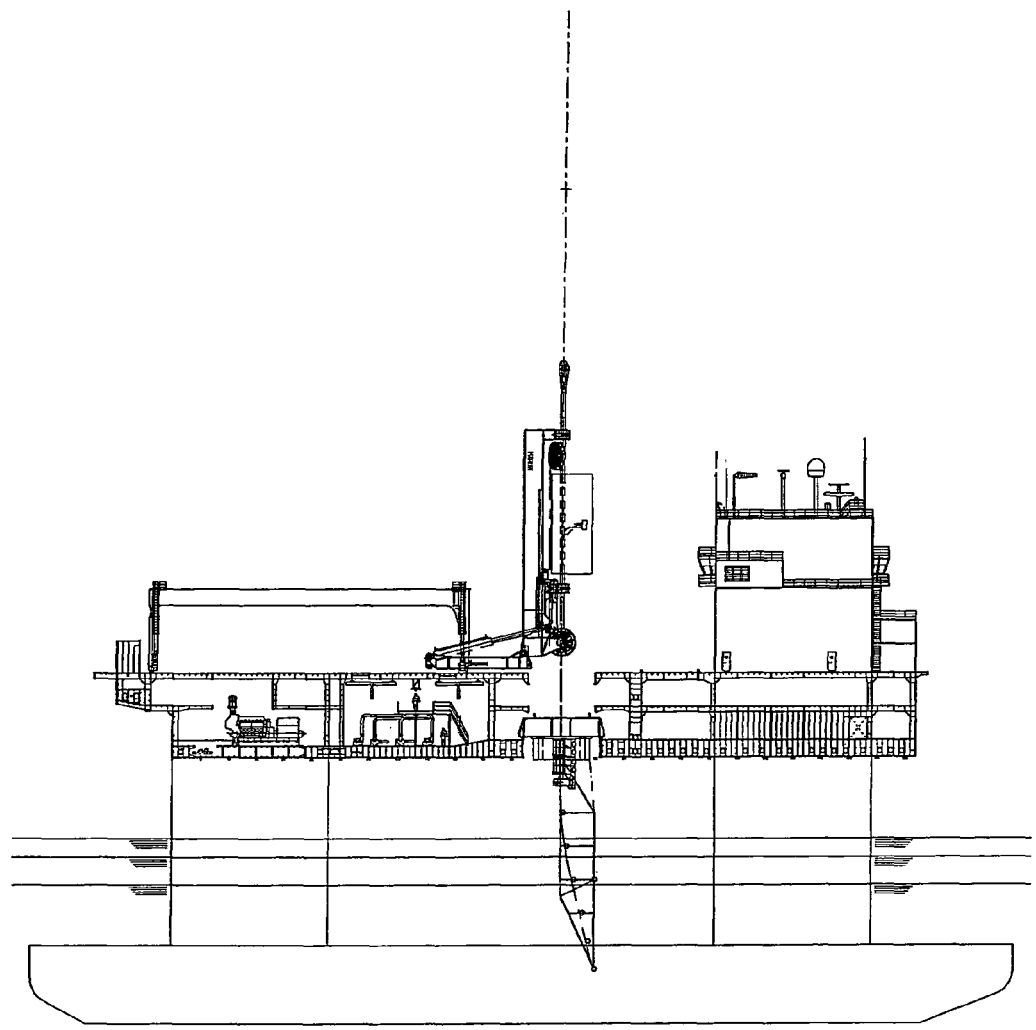
Figure 8D:
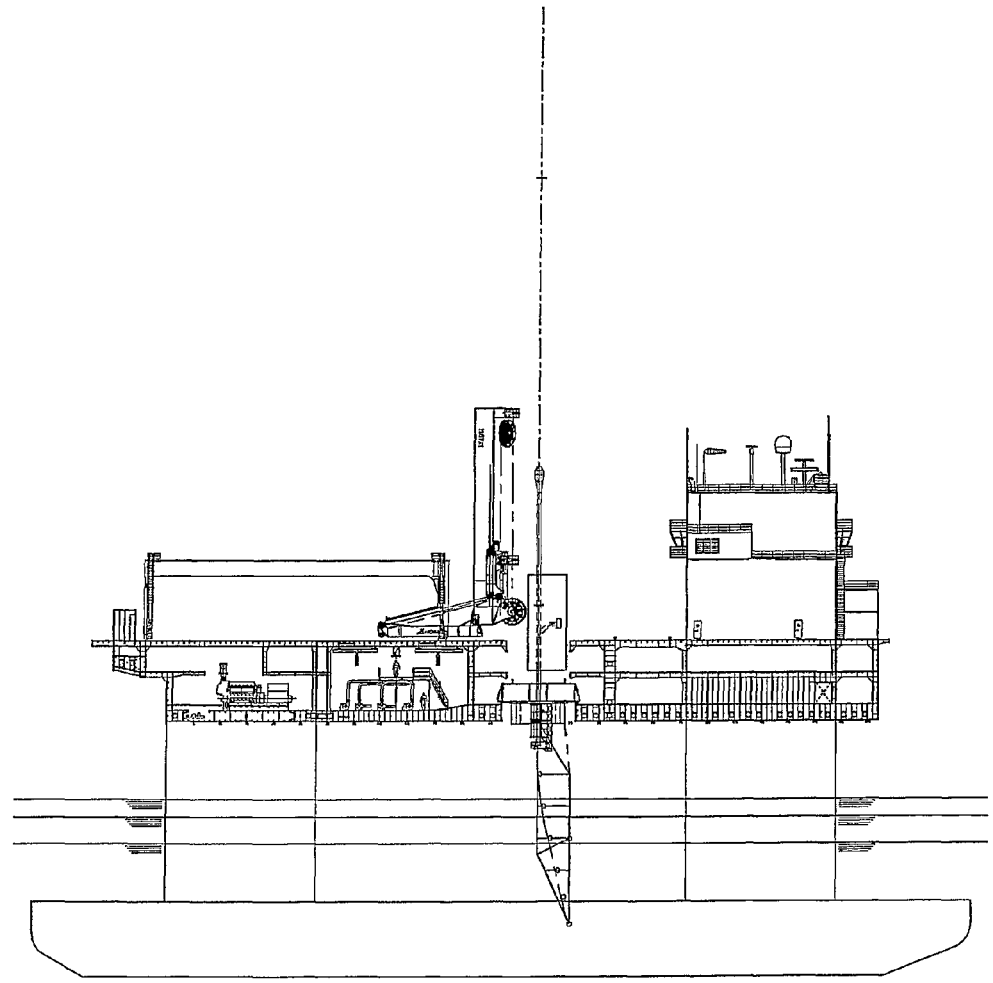
Figure 8E:
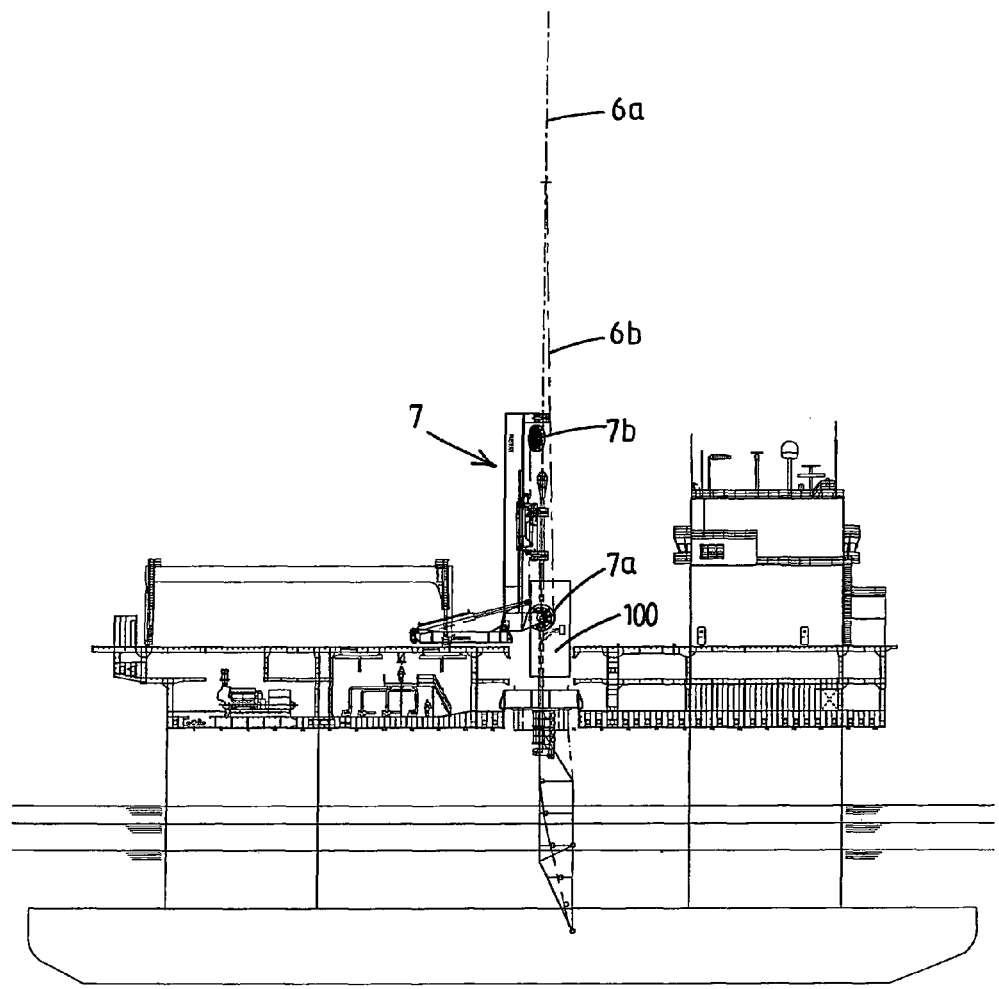
Figure 8F:
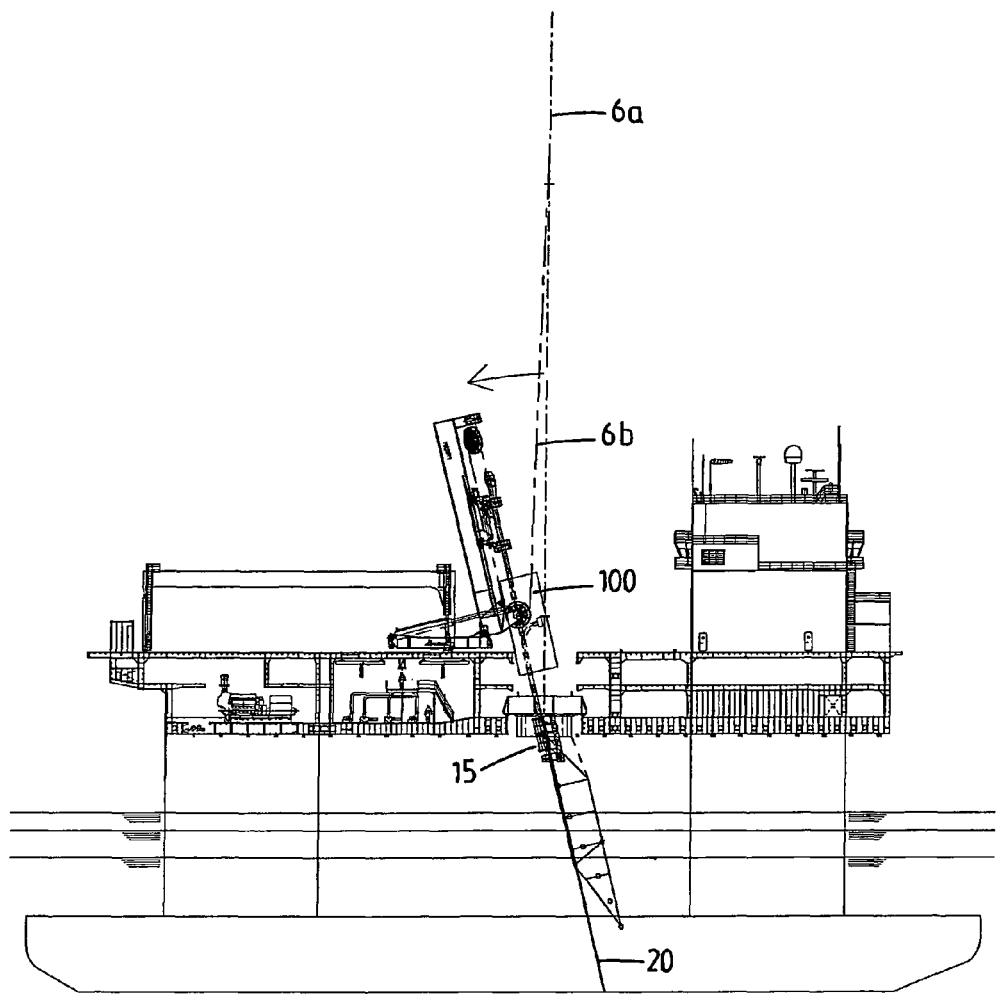
Figure 8G:
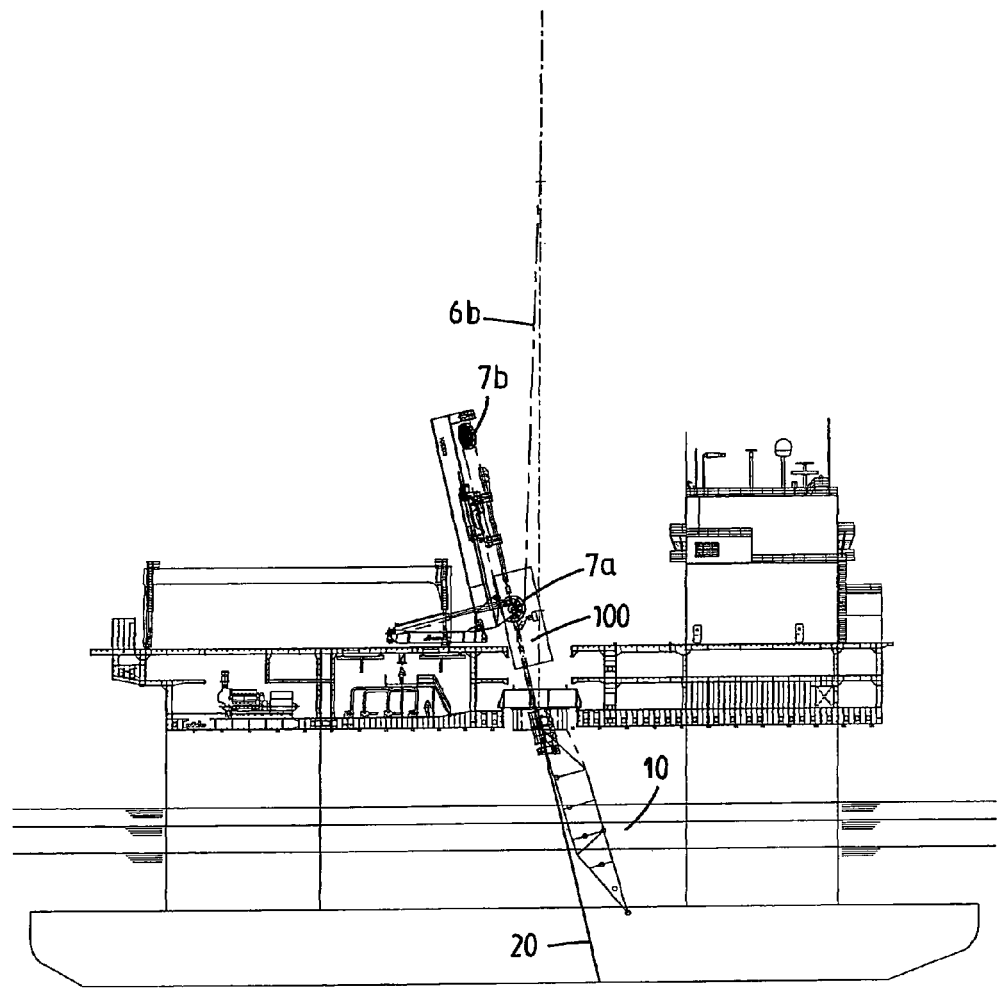
Figure 8H:
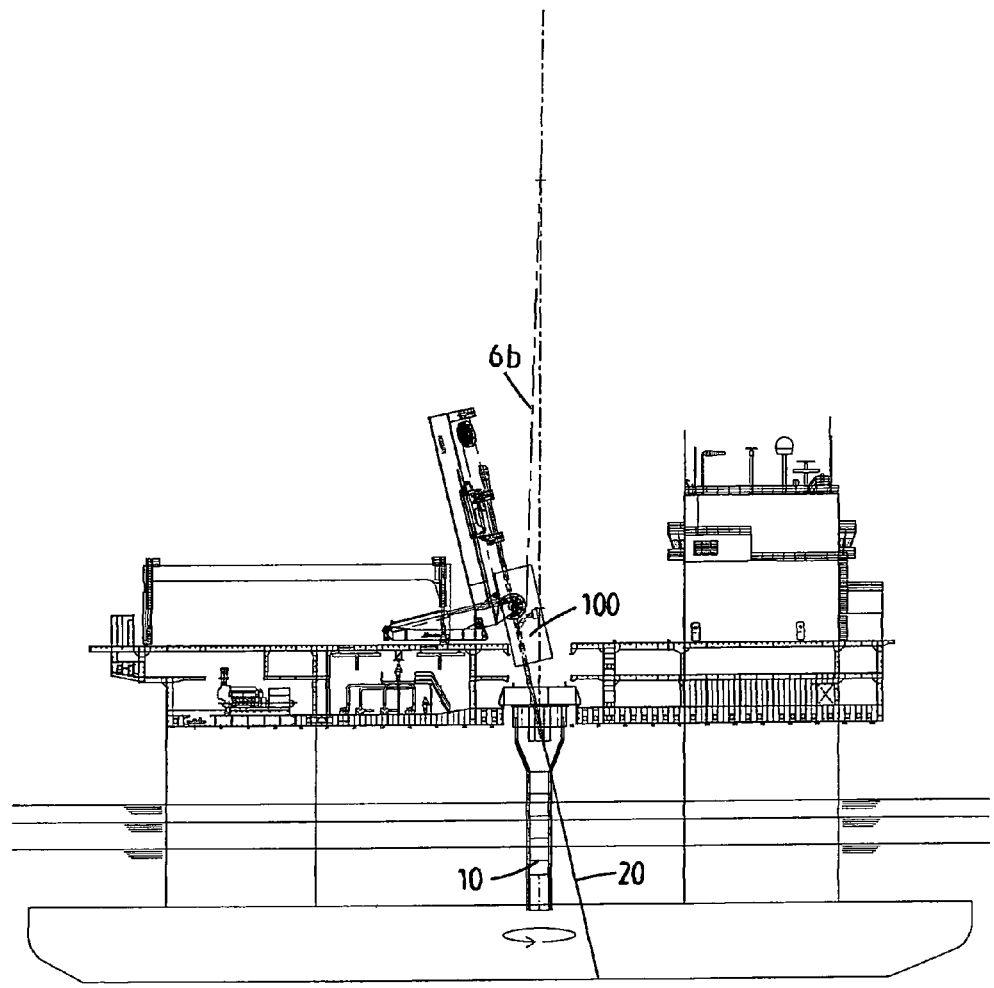
Figure 8I:
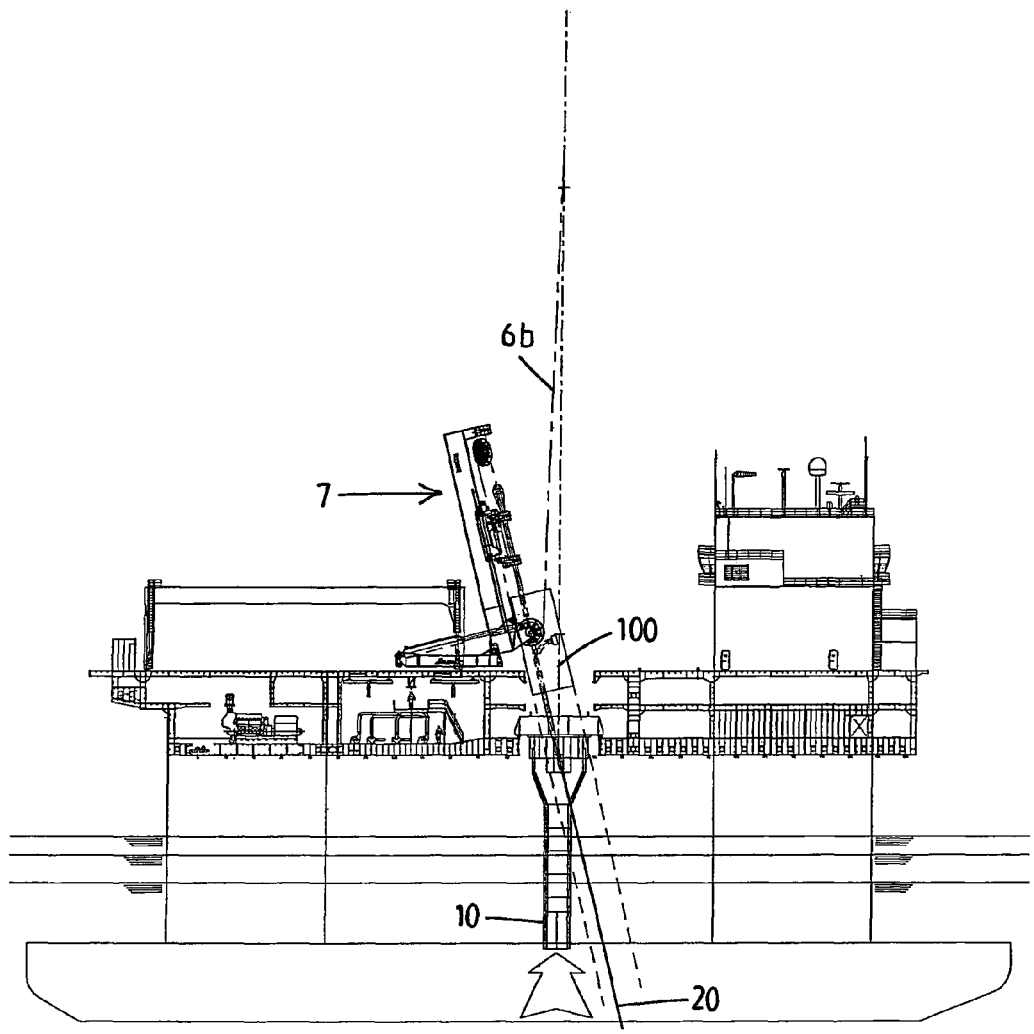
Figure 8J:
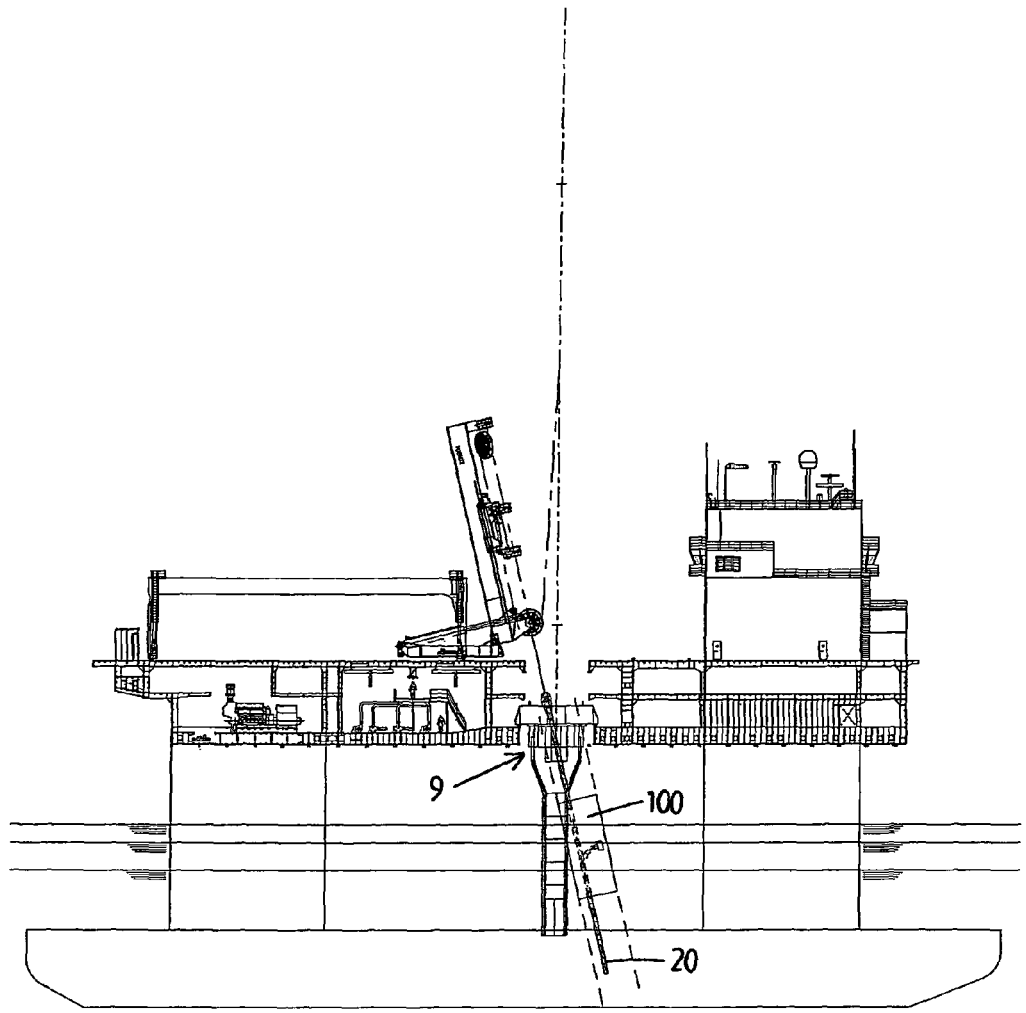
Figure 8K:
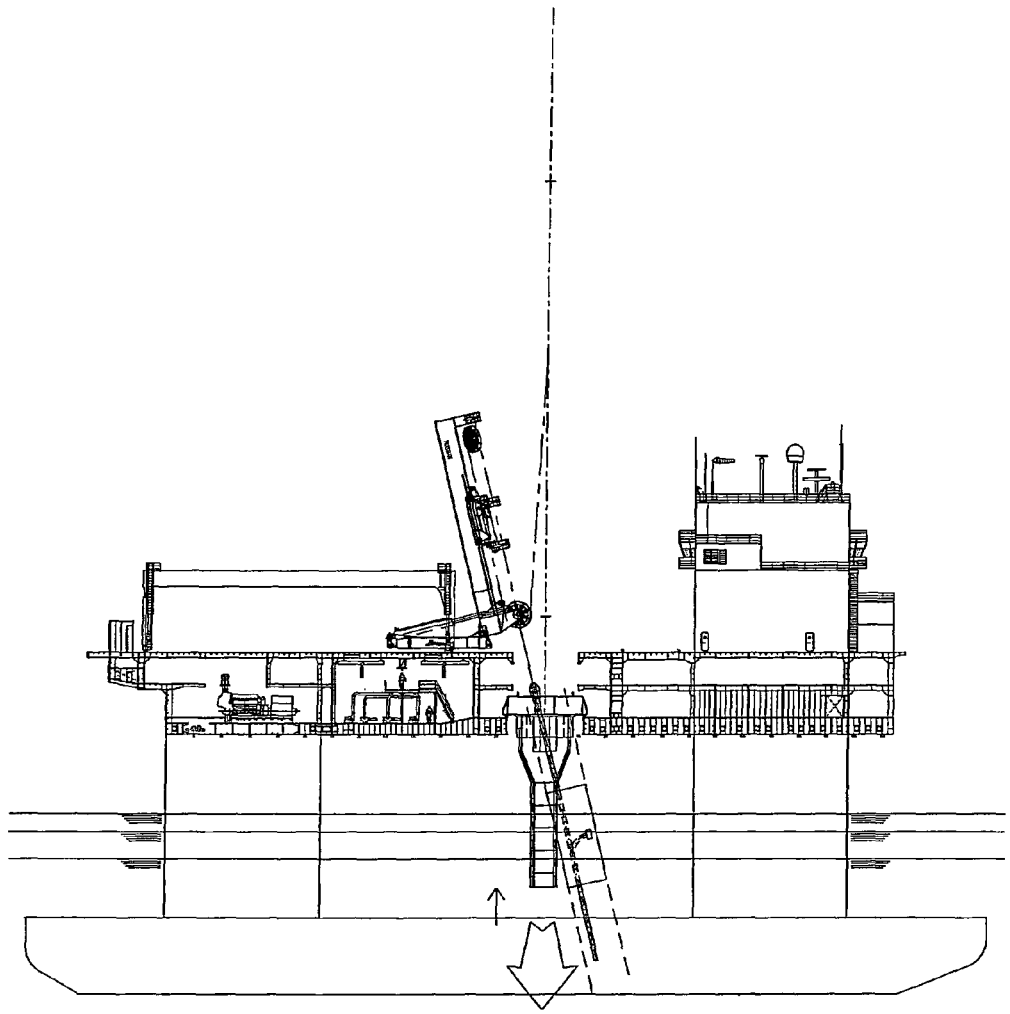
Figure 8L:
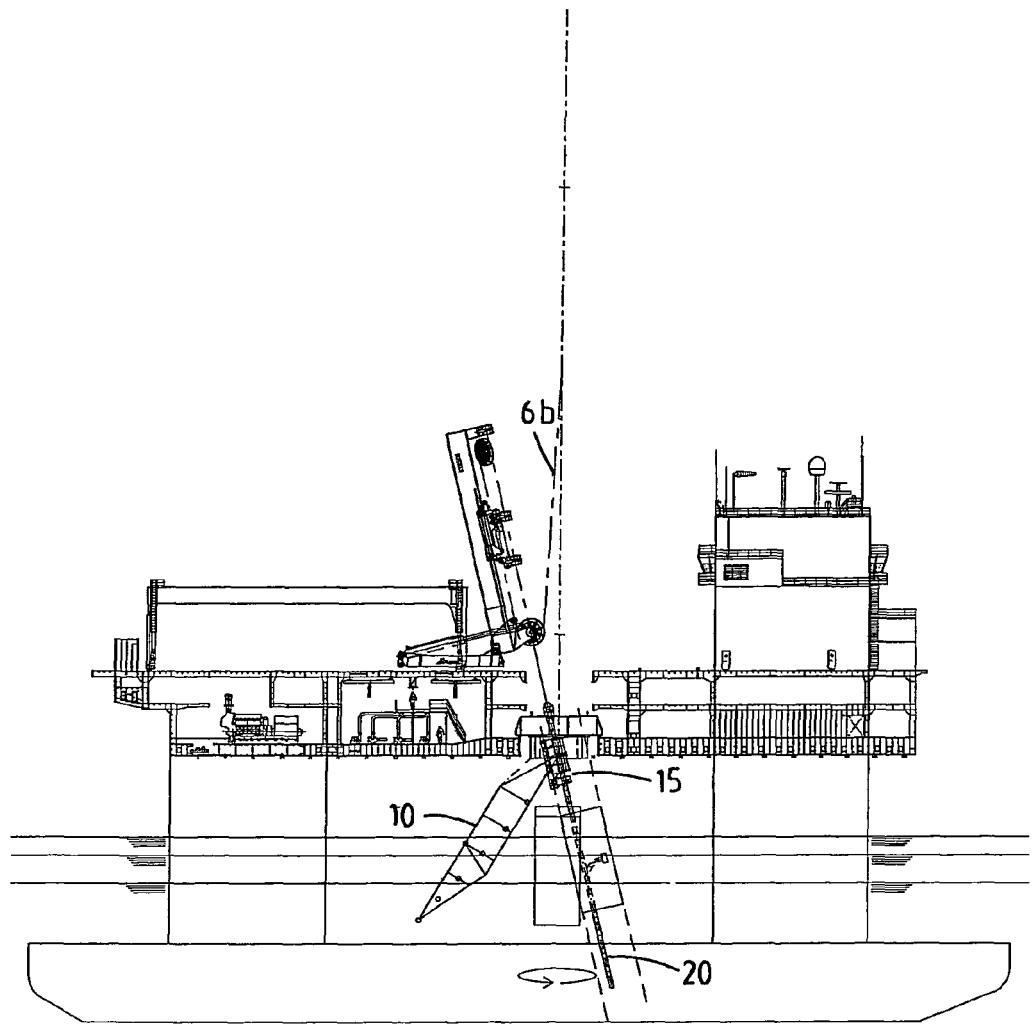
Figure 8M:
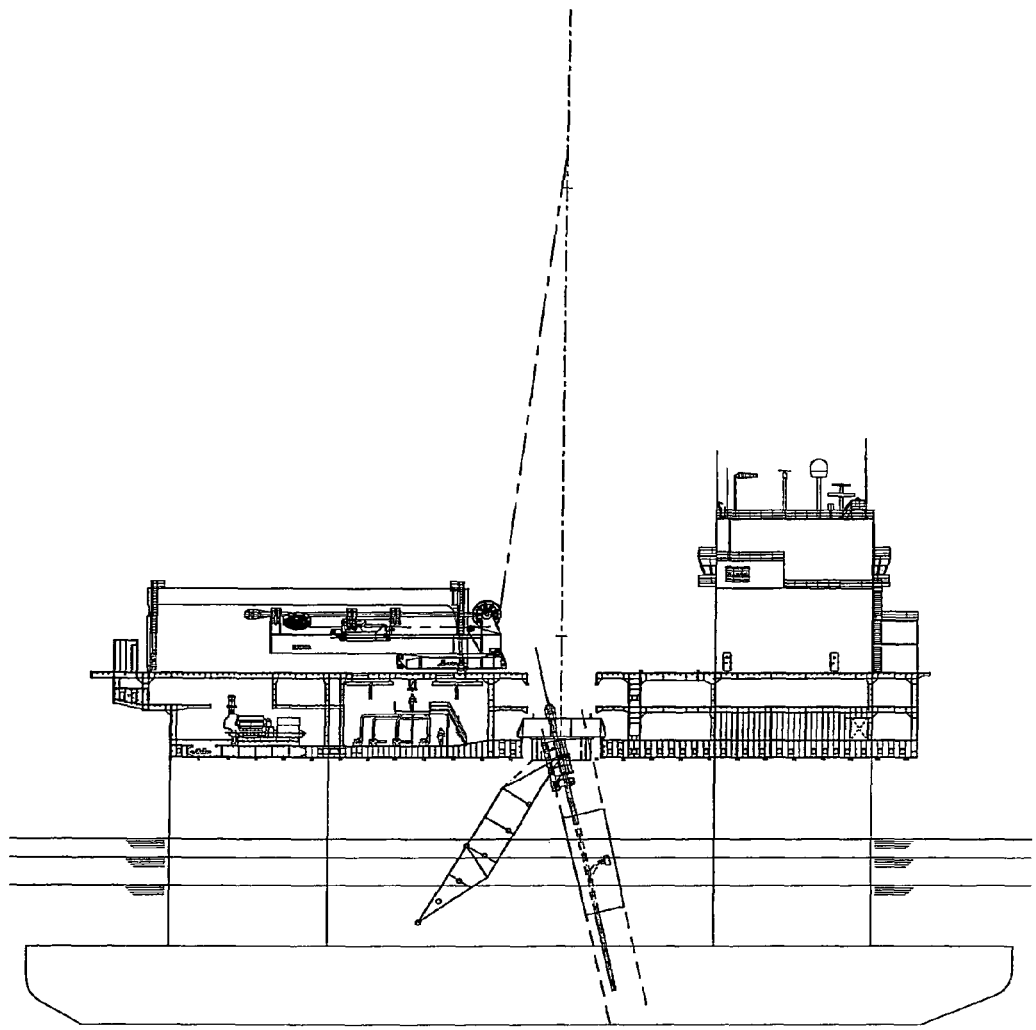
Figure 8N:
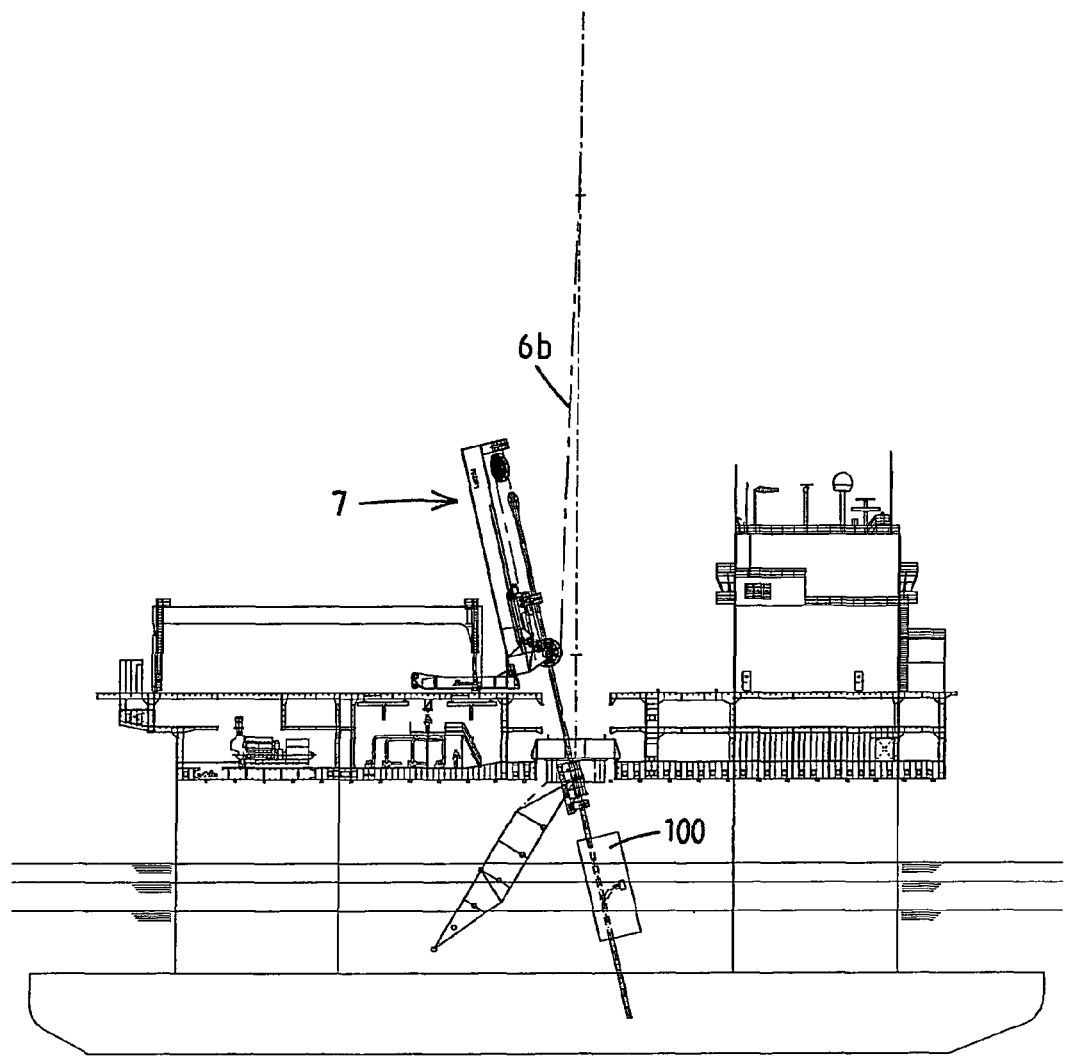
Figure 8O:
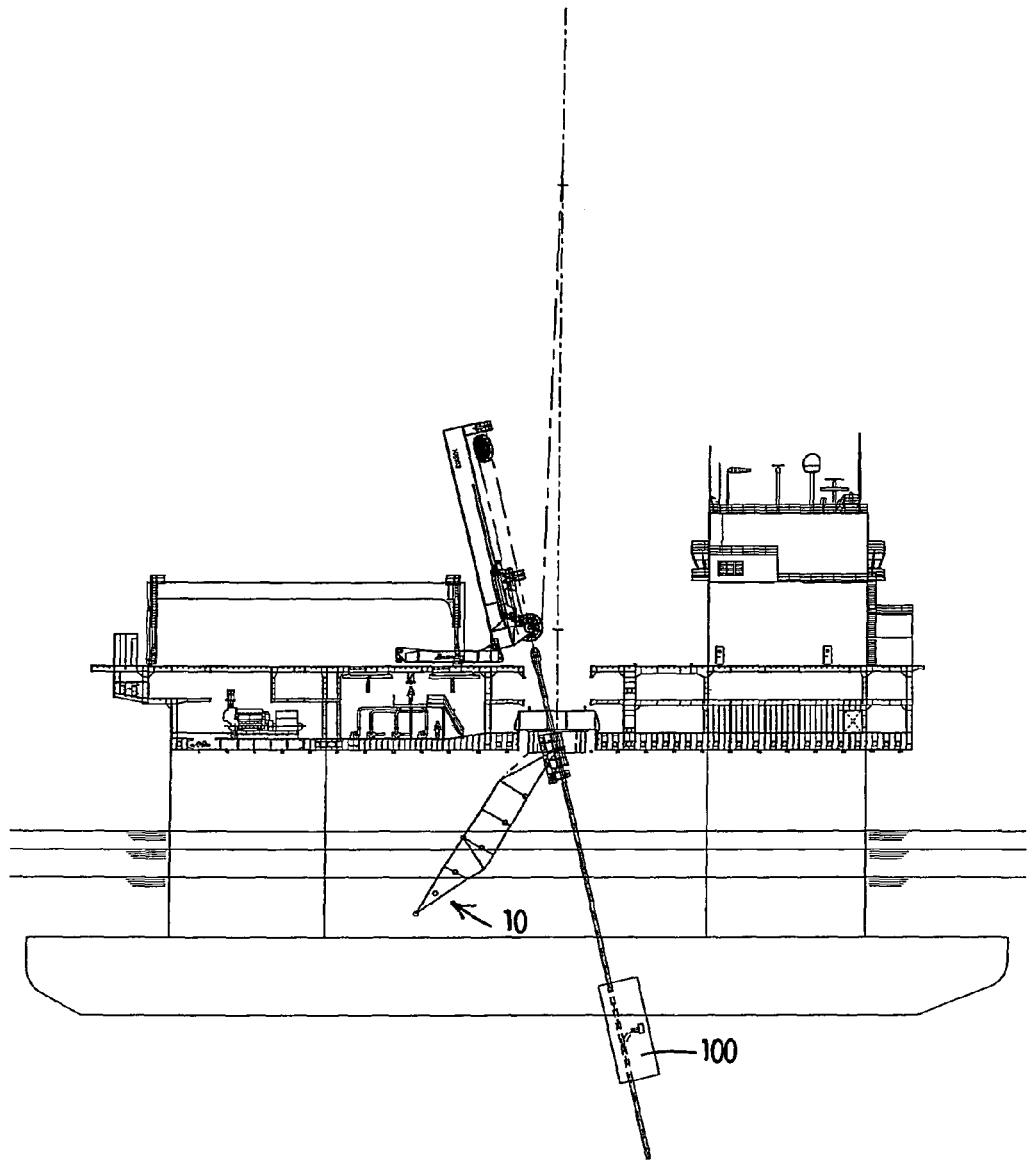
Figure 8P:
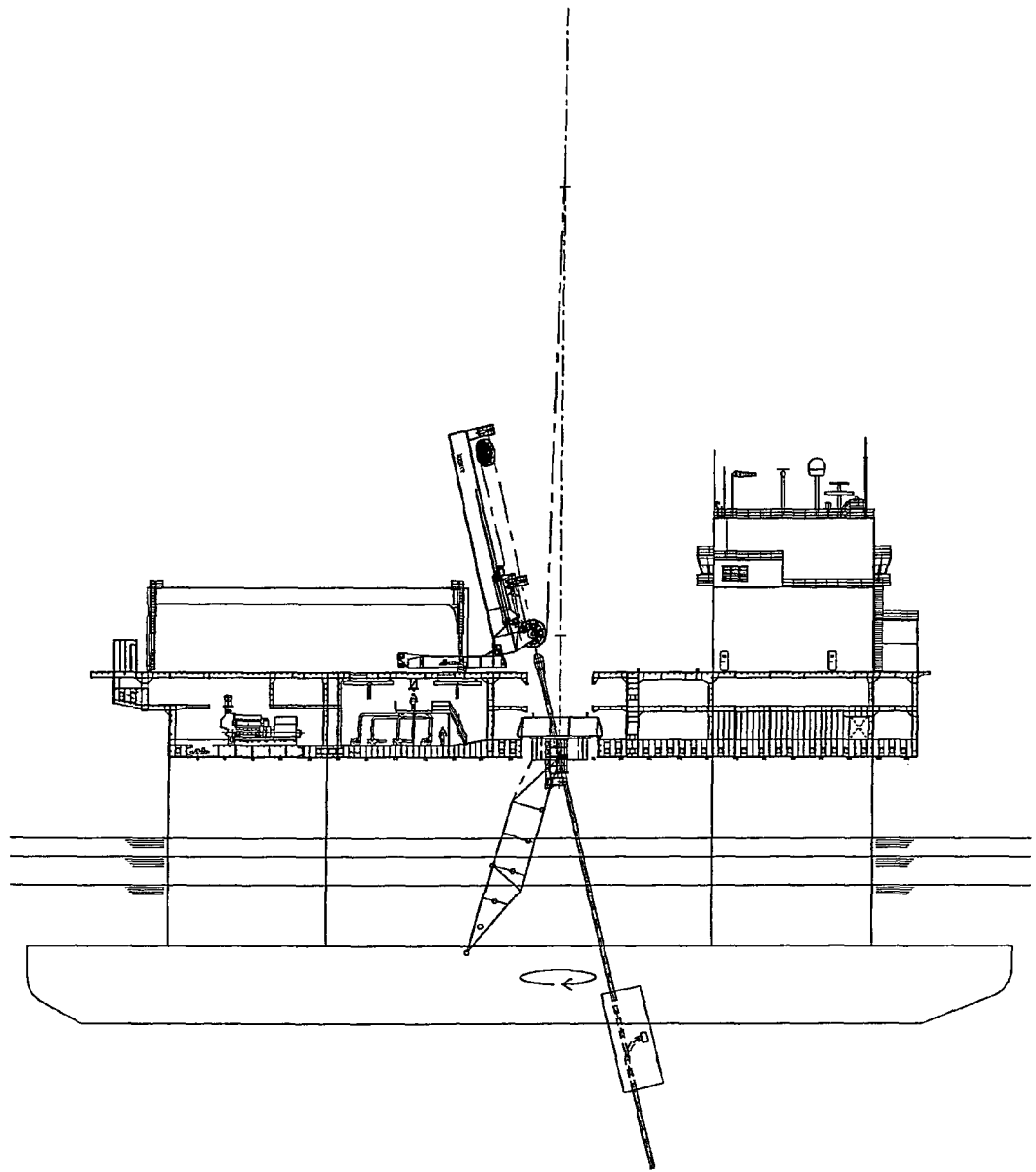
Figure 8Q:
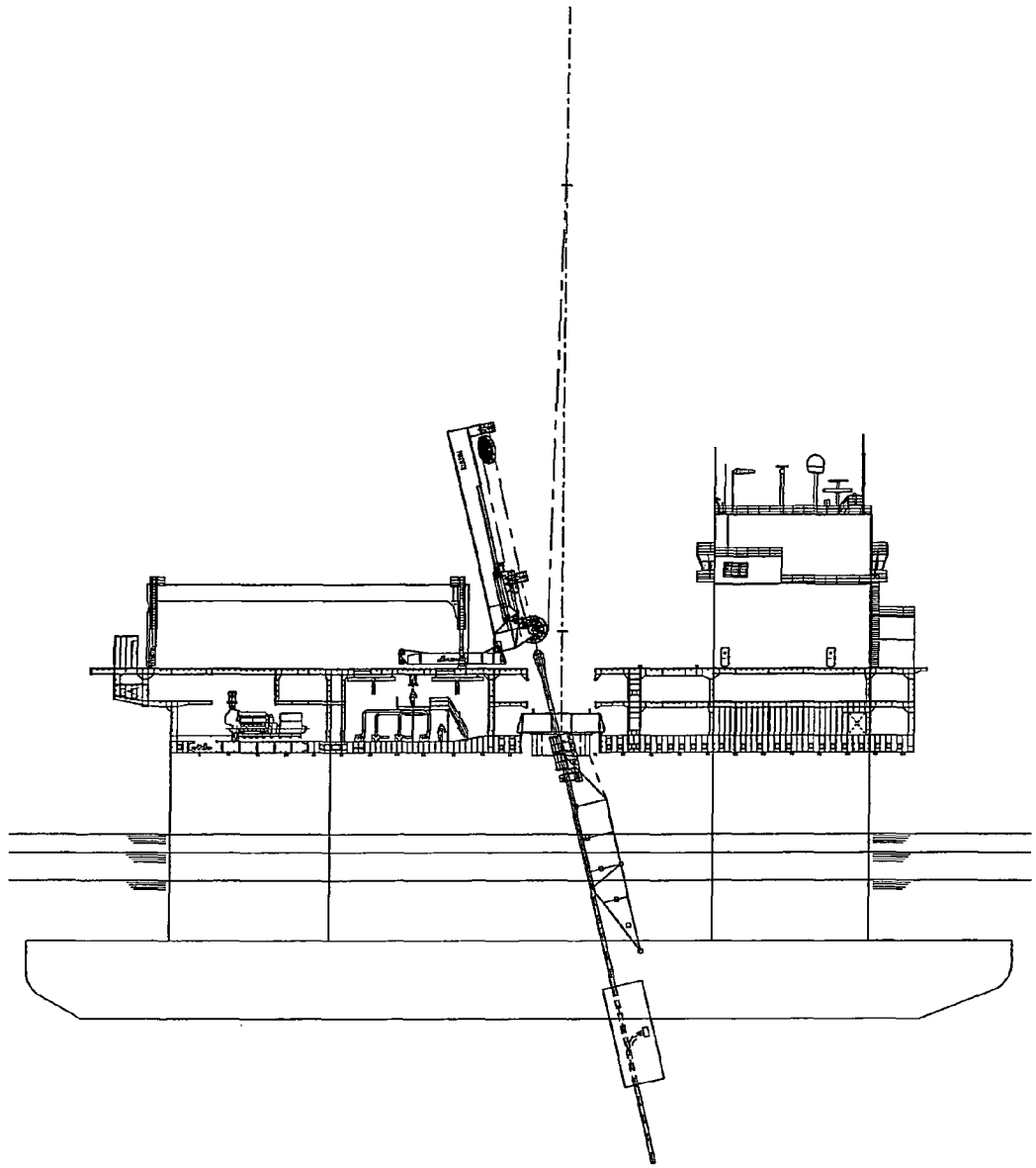
Figure 8R:
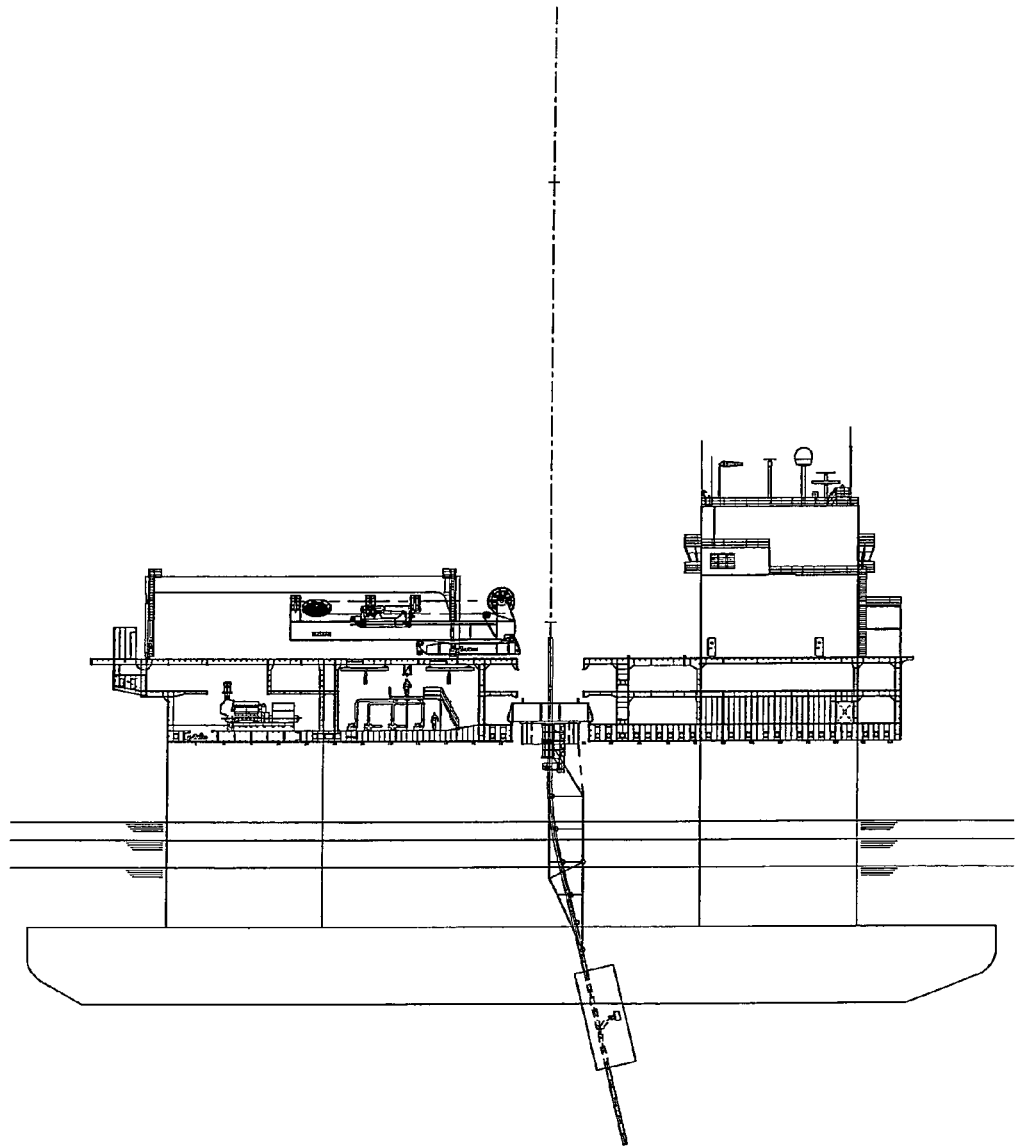
Figure 8S:
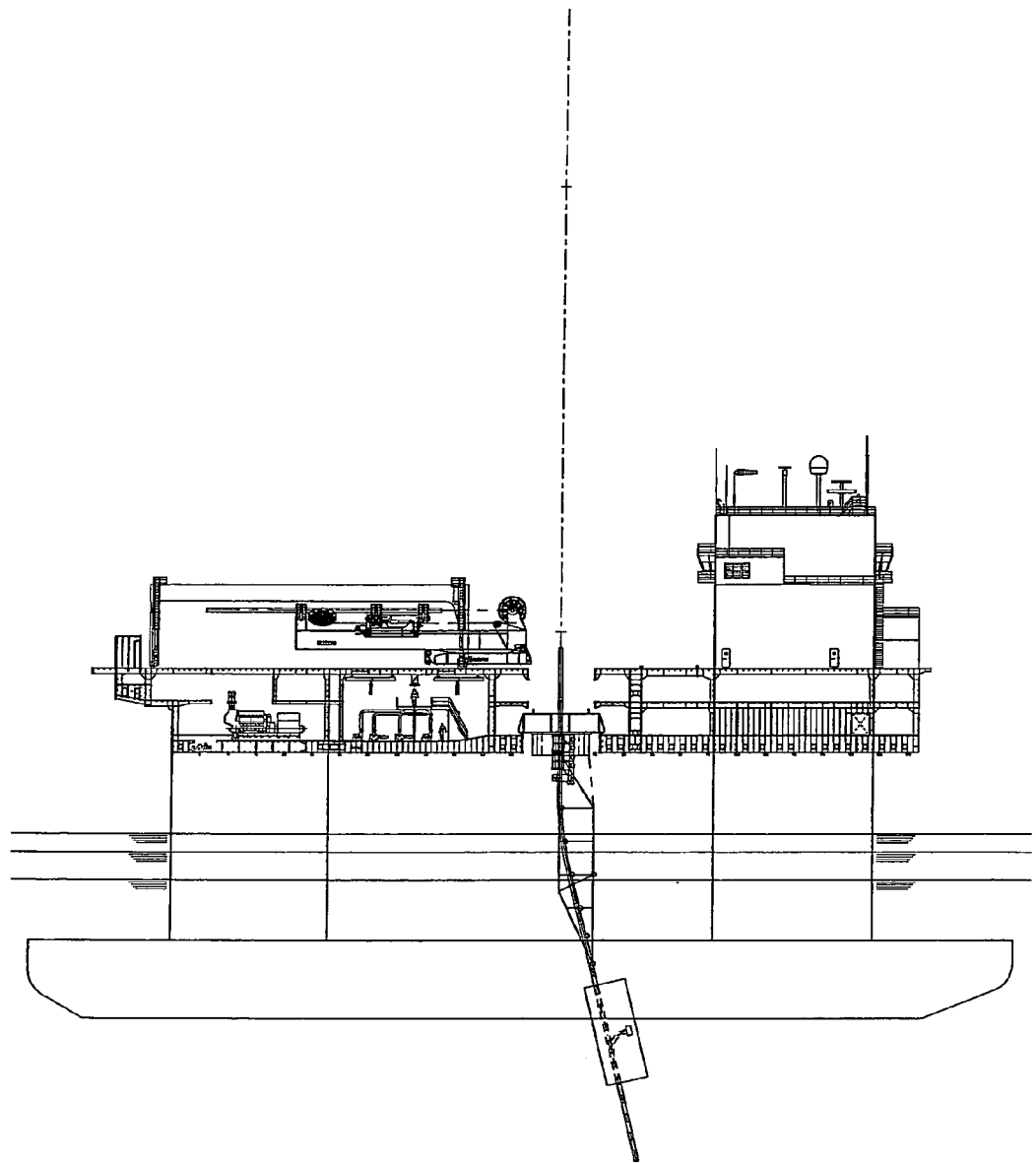
Figure 8T:
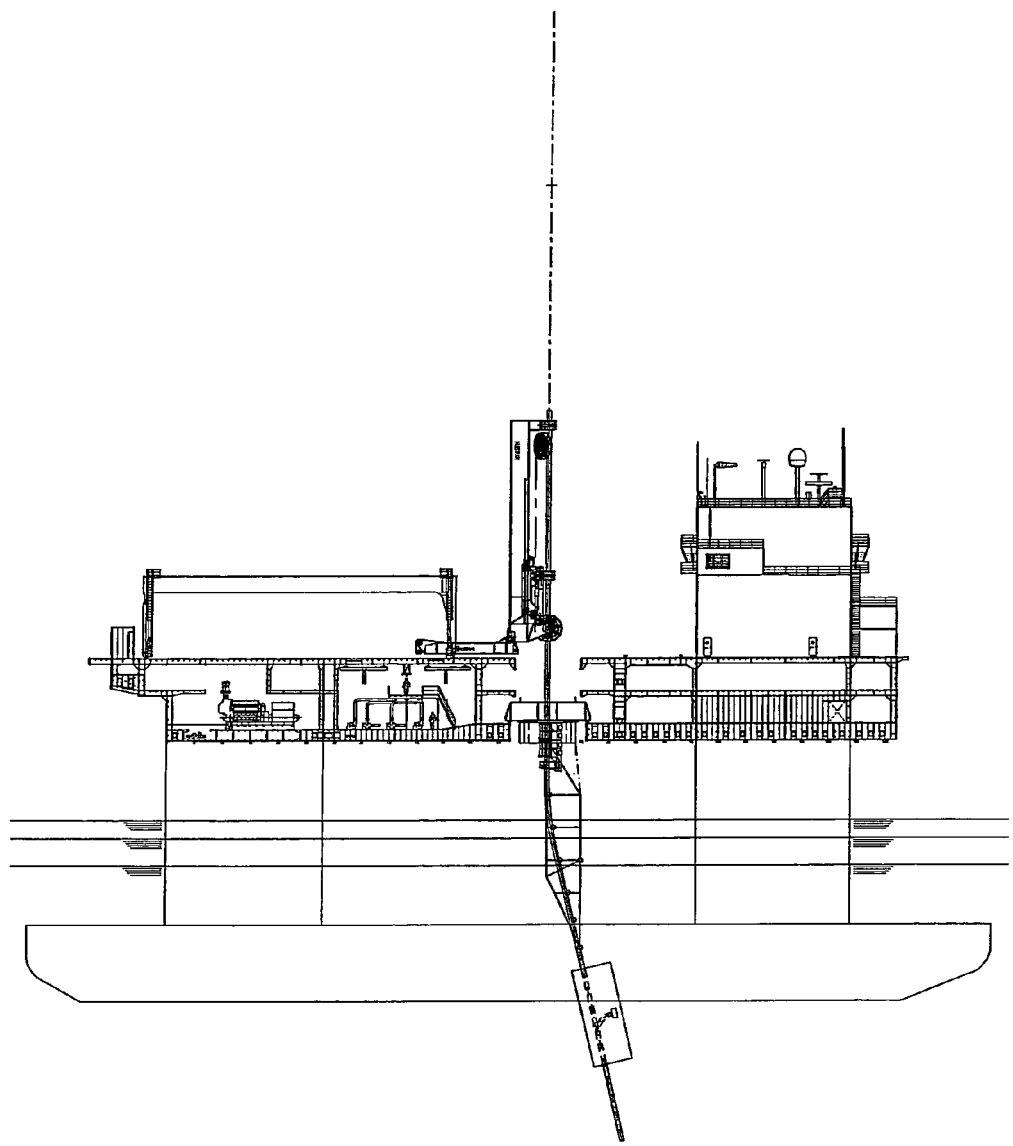

FIG. 1 shows a side view in perspective of a part of a semi-submersible vessel provided with a pipelaying system according to the invention, FIG. 2 shows in a perspective view a moonpool of the vessel of FIG. 1 from below with a stinger in its operational position, FIG. 3 shows the moonpool of FIG. 2, wherein the stinger is lifted to a lifted position, FIG. 4 shows the moonpool of FIG. 2, wherein the lifted stinger is rotated around a vertical axis, FIG. 5 shows the moonpool of FIG. 2, wherein the stinger is skidded sideways, FIG. 6a-6e shows in a side view the pivoting of the stinger with simultaneous pivoting of the hang off clamp, FIG. 7 shows a front view of a semi-submersible vessel with another embodiment of a pipelaying system according to the invention;

FIGS. 8a-t show an example of a vessel according to the invention as well as a method for pipelaying wherein use is made of said vessel.

In FIG. 1 is shown a twin hull semi-submersible vessel 1 having a non-submerging structure 2 and a submerging structure 3. The submerging structure 3 has two parallel hulls 4. The non-submerging structure 2 has multiple decks and is supported by columns 5 located on the hulls 4.

On the upper deck 2a of the non-submerging structure 2 is arranged a pipeline launch tower 6, which in the embodiment shown is in fact a drilling tower of the so called "Multiple Purpose Tower" (MPT) type. The launch tower 6 comprises pipe laying equipment defining a tower firing line. The launch tower 6 is mounted stationary in a vertical position on the vessel 1. Next to the tower 6 is located a loader 7 for loading new pipe sections to the tower 6. The loader 7 is tiltable and skiddable to deliver pipe sections to the tower firing line.

The loader 7 is provided with a line-up tool for lining up the new pipe section with the upper end of the already launched pipeline.

The pipe laying equipment may include welding stations, line-up tools, etc.

As is common the tower preferably includes a travel block that is displaceable up and down by one or more associated lowering wires and one or more winches, the travel block and lowering wire(s) and winch(es) being adapted to support and lower/raise the pipeline when released by the hang off module.

Referring to FIG. 2, the lower deck 2b of the non-submerging structure 2 with a moonpool 9 is visible. The moonpool 9 extends through the non-submerging structure 2. The launch tower 6 is mounted at or above the moonpool 9 to launch a pipeline (not shown).

At the lower end of the moonpool 9 is located a stinger 10 which is used during pipe laying for guiding and providing lateral support for the launched pipeline. Thereto the stinger 10 is provided with guiding members 11, e.g. sets of rollers. The guiding members preferably form a curved path for the pipeline.

The stinger 10 is here suspended at its upper end from a stinger support ring 12. The support ring 12 here is substantially horseshoe-shaped, in other words is shaped as an open ring as is best visible in FIG. 4.

In this embodiment the stinger 10 is connected to the stinger support ring 12 by two opposing pivot connections 13, which define a horizontal pivot axis. Furthermore the stinger 10 is connected to the stinger support ring 12 by means of hydraulic actuators 14. In FIG. 2 the stinger 10 is in its operational angular orientation position. By retracting the hydraulic actuators 14 the stinger 10 can be lifted to a lifted position as is illustrated in FIG. 3.

In the operational position, the stinger 10 defines a guiding curve for the launched pipeline. The stinger 10 in this example comprises two portions which are connected by hinges 18 and actuators 19. The radius of the guiding curve of the stinger 10 can be adjusted by extending or retracting the actuators 19. Alternatively or additionally the guiding curve of the stinger 10 can be adapted by moving the guiding members 11.

The pipelaying equipment also comprises a hang off module comprising a hang off clamp 15. In the preferred embodiment as shown in the figures, the hang off clamp 15 is mounted on the stinger support ring 12.

The stinger support ring 12 is here rotatable around a vertical axis by means of a rotational driving means (not shown). Thus by rotating the stinger supporting ring 12 both the stinger and the hang off clamp 15 are rotated about a vertical axis.

In FIG. 4 is shown the state wherein the stinger support ring 12 is rotated over an angle of 90° with respect to the state shown in FIG. 3.

The hang off clamp 15 is preferably pivotable about a horizontal pivot axis. This horizontal pivot axis is preferably the same pivot axis as the pivot axis defined by the pivot connections 13 of the stinger 10. In this way the hang off clamp 15 can be pivoted when the stinger 10 is lifted towards the lifted position such that the launched pipeline is kept as straight as possible and is prevented from buckling.

Preferably the stinger 10 and the hang off clamp 15 are pivotable about the common horizontal pivot axis simultaneously as is shown in FIGS. 6a-6e.

On opposite sides of the lower end of the moonpool 9 are provided guide tracks 16 which in this example extend in transverse direction of the vessel 1, so that the remote non-active position here is to port side and/or starboard side of the operational position.

The stinger support ring 12 is connected to a stinger skid-cart 17 (see FIG. 5) which in the specific embodiment shown is substantially U-shaped, wherein the portions 17a that form the legs of the U-shape are each able to travel along one of the guide tracks 16. The stinger 10 and the hang off clamp 15 are thus skiddable in transverse direction away from the firing line defined by the pipelaying equipment of the tower 6.

In use the vessel 1 with the tower 6 is used or the J-lay pipelaying technique. With this technique the previously launched pipeline is hanging off the hang off module comprising the hang off clamp 15 that engages the upper end of the already launched pipeline. The upper section of the already launched pipeline, which in FIGS. 6a-6e is indicated by reference numeral 20, is guided by the stinger 10 with its guiding members 11 (cf. FIG. 6a). A new pipe section is brought to the tower fire line by the loader 7. The line-up tool is used to line up the lower end of the new pipe section to the upper end of the previously launched pipeline. The lower end of the new pipe section is connected to the previously launched pipeline by welding or in any other suitable manner. After the new pipe section is connected to the previously launched pipeline the upper end of the new pipe section is connected to lowering means such as a moveable travel block and/or lowering wires.

In the specific embodiment shown in the figures, the MPT has a hoisting or travel block. The lowering wires are in this specific embodiment advantageously connected to the travel block. Next, the hang off clamp 15 can be released and the pipeline is lowered by a controlled lowering of the lowering means. Next, the hang off clamp 15 engages again on the launched pipeline, the lowering means is released and moved upwardly after which a new pipe section can be connected to the pipeline.

When an accessory such as an inline structure (ILS) or a pipeline end terminal (PLET) is to be attached to the upper end of the already launched pipeline, the method described below is preferably used:

The accessory is brought into the tower firing line by the loader 7. Next the accessory is connected to the upper end of the launched pipeline hanging from the hang off clamp 15, and the accessory is connected to the lowering means. The hang off clamp 15 can now be released from the launched pipeline whereby the accessory and the launched pipeline are suspending from the lowering means.

The stinger 10 is lifted from the lowermost position (cf. FIG. 2 and FIG. 6a) to the uppermost position (cf. FIG. 3 and FIG. 6e) by rotating it around the horizontal pivot axis by means of the actuators 14. With the rotation of the stinger 10 around the horizontal axis also the hang off clamp 15 is rotated around the horizontal pivot axis. The stinger 10 thus rolls of the suspending pipeline 20 as can be seen in FIGS. 6a-6e.

Next, the stinger support ring 12 is rotated around the vertical axis over 90° (cf. FIG. 4) thereby rotating the stinger 10 and the hang of clamp 15 over 90°. The hang off clamp 15 is opened to such an extent that the inclined launched pipeline (cf. FIG. 6e) is not impeding the rotation of the hang off clamp 15 around the vertical axis.

Next, the lifted and rotated stinger 10 together with the hang off clamp 15 is skidded out of the firing line by means of the stinger skidcart 17 which is driven along the guiding tracks 16. Because the stinger 10 is lifted and rotated, in some vessel designs the stinger 10 can extend between the columns 5 of one of the hulls 4 without colliding with the corresponding hull 4 when it is skidded aside to the position as is illustrated in FIG. 5.

The accessory with the launched pipeline is lowered by the lowering means through the moonpool 9 beyond the position of the hang off module in the firing line. Then the hang off clamp 15 and the stinger 10 are skidded back towards the firing line (cf. FIG. 4), and are rotated around the vertical axis towards the position as is shown in FIG. 3.

The hang off clamp 15 engages the launched pipeline at the upper end of the accessory. A new pipe section is brought in the firing line and connected by welding to the upper end of the accessory. The lowering means are connected to the upper end of the new pipe section, and the hang off clamp 15 is released from the upper end of the already launched pipeline thereby suspending the pipeline from the lowering means. The pipeline is then lowered by means of the lowering means.

After the pipeline is lowered and gripped again by the hang off clamp 15 (cf. FIG. 6e), the stinger 10 is lowered by actuating the actuators 14 into its operational position as is shown in FIG. 2 and FIG. 6a and in which it can guide the launched pipeline. In the preferred embodiment the hang off clamp 15 and the stinger 10 have a same horizontal pivot axis as was mentioned above. Thus the stinger 10 and the hang off clamp 15 can be pivoted back simultaneously to the operational position as is shown in FIGS. 6e to 6a. In this manner the stinger 10 forms the launched pipeline into the desired shape when the stinger 10 and the hang off clamp 15 are be pivoted back. Although the stinger 10 and the hang off clamp 15 are rotatable simultaneously around the horizontal axis, it is preferable that they can be moved independently from each other.

In FIG. 7 is shown a semi-submersible vessel 101 provided with a so called "dual Multi Purpose Tower" (dual MPT) 106 as pipe launching tower. The vessel 101 has two firing lines indicated with 109a and 109b respectively. The firing lines 109a, 109b extend next to the tower 106. The vessel 101 has a stinger 110 which can be rotated, pivoted and skidded as is described in the above with regard to stinger 10 shown in FIGS. 1-6. The vessel 101 furthermore has a cart 102 from which a riser string 103 hangs off. The cart 102 can be skidded aside from the firing line 109b towards the side of the vessel 101. By displacing the riser string 103 enough space is created such that the lifted and rotated stinger 110 can be skidded from the other firing line 109a to a position more or less in the centre of the vessel 101, between the firing line 109a and the hung off riser string 103. This embodiment has the advantage that a riser string 103 does not have to be disengaged from the vessel 101 in order to be able to displace the stinger 110 from the other firing line 109a.

It should be noted that the launch tower 6 and 106 in the embodiments shown are mounted stationary in a vertical position on the vessel 1, 101. This is however not necessary. It is for instance conceivable to have a launch tower which is tiltably mounted on the deck, wherein the pipeline is launched by the tilted tower and bended by the stinger in a direction transverse to the plane of the tower.

FIGS. 8a-t show an example of a vessel according to the invention as well as a method for pipelaying wherein use is made of said vessel. Parts that are identical or similar to parts described with reference to FIGS. 1-7 have been denoted with the same reference numerals. Not shown in the FIGS. 8a-t is the launch tower 6, which is consider to be mounted at or above the moonpool, preferably a vertical fixed orientation tower, preferable including one or more of the details explained with reference to tower 6. Depicted here is the vertical tower firing line 6a.

Also not shown in FIGS. 8a-e is the launched pipeline, which will follow the path of the stinger 10 during those stages.

In FIG. 8a the loader 7 is shown in its lowered receiving position and an ILS 100 with a section of pipe fitted to its upper and lower end has been placed on the loader. The ILS here is depicted as a cubic object but this is merely to show possible extreme dimensions of such an ILS.

In FIG. 8b the loader 7 has been pivoted upwards, e.g. with associated hydraulic cylinders, and reach an erected position, wherein the extremity to be connected to the launched pipeline is positioned above the upper end of said launched pipeline.

In FIG. 8c the ILS 100 is suspended from the travel block and lowered onto the previously launched pipeline. Then the weld is made.

In FIG. 8d the loader 7 has been retracted by translating the loader 7 away from the firing line 6a. The ILS 100 is lowered using the travel block as the hang off clamp has been opened temporarily.

In FIG. 8e it is shown that the loader 7 includes an arrangement of an or more sheaves 7a, b along which a lowering wire 6b that has been detached from the travel block has been passed so as to connect said lowering wire to the pipe section and/or accessory 100 on the loader.

Now (see FIG. 8f) the loader 7 with ILS 100, as well as the hang off module 15 and stinger 10 are pivoted to assume a rectilinear state (here referred to as the departure angle) of the launched pipeline through and below the hang off clamp 15, the ILS being in angular orientation aligned with the angle of the launched pipeline 20. The weight of the launched pipeline can now be carried by the lowering wire(s) so that the hang off clamp 15 can be released.

In FIG. 8g the stinger 10 is pivoted further upwards and in FIG. 8h the stinger 10 (with the hang off clamp) is then rotate about a vertical axis, here so as to be oriented transverse with respect to the longitudinal axis of the vessel.

Then the stinger with hang off module are skidded to the port side of the vessel (see FIG. 8i).

The pipeline 20 with the ILS 100 is then lowered using the lowering wires 6b (FIG. 8j), so that the ILS passes through the moonpool 9, unhindered by the stinger and hang off clamp which are in their remote non-active position.

The lowering is performed until the hang off module 15 can be brought to engage on the pipe section fitted to the upper end of the ILS, and then the stinger and hang off module are moved to the operation position again (FIG. 8k) and the hang off module is made to engage on the pipe section (see FIGS. 8l and 8m) by rotating the stinger and the hand off module along the vertical axis. The load is then transferred to the hang off module and the loader is being brought down to pick up the pipe (FIG. 8m).

Now the lowering wire 6b is detached from the pipeline and the loader 7 can be used to pick up a new pipe section to be welded to the upper end of the ILS pipe section. (FIG. 8n). The lowering wire 6b is connected to the upper end of said new pipe section.

By transferring the load to the lowering wire 6*b*, the hang off clamp can be released and the pipeline lowered further so that the ILS is now lowered to a level below the stinger 10. (see FIG. 8*o*).

By pivoting and rotating the stinger 10 (FIGS. 8*p* and 8*q*) as well as engaging the clamp 15 with the pipeline the lowering wire can be released (FIG. 8*r*) as well as the pipelaying operation continued as shown in the FIGS. 8*q*-*t*. In FIG. 8*s* it is shown that normal pipe lay operations may be resumed, and a pipe may be positioned in the loader. In FIG. 8*t* the loader is upended, an ELUT lowered and the pipe being welded.

The invention claimed is:

1. A vessel for laying pipe sections and an accessory into the sea, forming an offshore pipeline having a weight, the accessory having dimensions larger than a pipeline section, the vessel comprising:
   - a hull onto which a pipeline launch tower is mounted, the pipeline launch tower comprising pipe laying equipment defining a firing line in which the pipe sections provided with the accessory are launched into the sea to form the offshore pipeline, the pipe laying equipment including a lowering device adapted to lower the offshore pipeline;
   - a hang off module provided at a lower end of the pipeline launch tower, the hang off module being adapted to support the weight of the offshore pipeline, the hang off module being movable between a hang off operational position in the firing line and a hang off non-active position remote from the firing line;
   - an accessory handling system for positioning an accessory above the offshore pipeline suspended from the hang off module, wherein the accessory is to be connected to the offshore pipeline;
   - a stinger supported at an upper end thereof by a stinger support assembly, the stinger in a stinger operational position thereof being adapted to guide the offshore pipeline generally below the hang off module in the firing line into the sea; and
   - the stinger support assembly provided below the hang off module, comprising a stinger support ring which is supported by the hull and which is rotatable with respect to the hull and to the pipeline launch tower over at least 90°, wherein a rotation drive is provided to rotate the stinger support ring around a vertical axis, to allow for displacement of the stinger with respect to the pipeline launch tower between the stinger operational position and a remote stinger non-active position which is remote from the firing line to allow the lowering of the accessory in the firing line by the lowering device.

2. The vessel according to claim 1, wherein the stinger support assembly is adapted to allow for substantially horizontal displacement of the upper end of the stinger to the remote stinger non-active position.

3. The vessel according to claim 1, wherein the stinger support assembly further includes a pivot connection for the upper end of the stinger, such that the stinger is pivotable up and down between an uppermost stinger position and a lowermost stinger position.

4. The vessel according to claim 2, wherein the stinger support assembly includes one or more guide tracks mounted on the vessel, and wherein the stinger support ring is displaceable along the one or more guide tracks.

5. The vessel according to claim 1, wherein the vessel is provided with a moonpool through which the pipeline is launched.

6. The vessel according to claim 5, wherein the stinger support assembly includes one or more guide tracks mounted on the vessel on opposed sides of the moonpool, and wherein the stinger support ring is displaceable along the one or more guide tracks.

7. The vessel according to claim 1, wherein the hang off module is carried by the stinger support assembly such that the hang off module is displaceable along with the stinger to the remote stinger non-active position.

8. The vessel according to claim 7, wherein the hang off module is pivotally carried by the stinger support assembly, such that the upper end of the stinger and the hang off module are pivotable about a common substantially horizontal pivot axis, the pivoting of the hang off module being independent from the pivoting of the stinger.

9. The vessel according to claim 7, wherein the hang off module and the stinger are mounted to a common support member.

10. The vessel according to claim 1, wherein the vessel is a twin-hull semi-submersible vessel.

11. The vessel according to claim 1, wherein the stinger support assembly is adapted to allow for displacement of the stinger to a remote stinger non-active position that is located to the port side or starboard side of the stinger operational position.

12. The vessel according to claim 1, wherein the vessel further includes a movable loader that allows to receive a pipe section or an accessory in a receiving position of the movable loader and allows to bring said pipe section or accessory such that the pipe section or accessory is connectable to an upper end of the pipeline supported by the hang off module.

13. The vessel according to claim 12, wherein the movable loader is pivotable about a horizontal pivot axis allowing to move the movable loader between a lowered receiving position and an erected position.

14. The vessel according to claim 1, wherein the pipeline launch tower includes a travel block that is displaceable up and down by one or more associated lowering wires and one or more winches, the travel block and the one or more lowering wires and the one or more winches being adapted to support and lower or raise the pipeline when released by the hang off module.

15. The vessel according to claim 14, wherein the vessel further includes a movable loader that allows to receive a pipe section or an accessory in a receiving position of the movable loader and allows to bring said pipe section or accessory such that the pipe section or accessory is connectable to an upper end of the pipeline supported by the hang off module, and
   - wherein the movable loader includes an arrangement of one or more sheaves along which a lowering wire that has been detached from the travel block can be passed so as to connect said lowering wire to the pipe section or accessory on by the movable loader.

16. The vessel according to claim 1, wherein the vessel includes a welding station arranged and adapted to weld a pipe section to an upper end of the previously launched pipe section held by the hang off module.

17. The vessel according to claim 1, wherein the pipeline launch tower is mounted stationary in vertical orientation on the vessel.

18. The vessel according to claim 17, wherein the pipeline launch tower includes two hoisting devices each including a travel block, one or more lowering wires and one or more associated winches, the travel blocks being arranged on opposite sides of the tower.

19. The vessel according to claim 18, wherein the pipeline launch tower is a mast, the travel blocks being mounted on opposed exterior sides of the mast.

20. A method for laying an offshore pipeline, comprising the step of using the vessel according to claim 1.

21. The method according to claim 20, wherein the method further comprises the following steps:
launching the pipeline into the sea via the stinger;
stopping the launch of the pipeline, and hanging off the pipeline in the hang off module;
positioning an accessory above an upper end of the pipeline by means of an accessory handling system;
attaching the accessory to the pipeline when held in the hang off module and attaching the accessory to a lowering device;
releasing the hang off module from the pipeline and suspending the accessory and the pipeline from the lowering device;
displacing the stinger to the remote stinger non-active position;
displacing the hang off module to a remote hang off non-active position;
lowering the accessory with the pipeline by the lowering device to a position below a hang off operational position of the hang off module;
repositioning the hang off module to the hang off operational position;
hanging off the pipeline with the accessory in the hang off module;
providing a new pipe section and attaching the new pipe section to the upper end of the accessory;
connecting the lowering device to the new pipe section;
releasing the hang off module and suspending the pipeline from the lowering device;
lowering the pipeline by means of the lowering device; and
reposition the stinger in the stinger operational position.

22. The method according to claim 21, wherein displacing the stinger comprises the steps of:
lifting the stinger;
rotating the stinger around a vertical axis; and
translating the stinger to the remote stinger non-active position.

23. The method according to claim 21, wherein the stinger is repositioned in the stinger operational position by:
translating the stinger to the stinger operational position below the pipeline launch tower;
rotating the stinger back around said vertical axis; and
lowering the stinger from the lifted stinger position to an operational angular orientation.

24. The method according to claim 20, wherein the stinger and the hang off module are pivoted simultaneously about a horizontal pivot axis.

25. The method according to claim 20, wherein the stinger and the hang off module are translated simultaneously.

26. A marine pipelaying system for laying pipe sections and an accessory into the sea, forming an offshore pipeline having a weight, the accessory having dimensions larger than a pipe section, the system being adapted to be mounted on a marine pipelaying vessel, said system including:
a hang off module provided at a lower end of a pipeline launch tower, the hang off module being adapted to support the weight of the offshore pipeline, the hang off module being movable between a hang off operational position in a firing line and a hang off non-active position remote from the firing line;
an accessory handling system for positioning an accessory above the offshore pipeline suspended from the hang off module, wherein the accessory is to be connected to the offshore pipeline;
a stinger supported at an upper end thereof by a stinger support assembly, the stinger in a stinger operational position thereof being adapted to guide the offshore pipeline generally below the hang off module in the firing line into the sea; and
the stinger support assembly provided below the hang off module, comprising a stinger support ring which is supported by a hull of the marine pipelaying vessel, the stinger support assembly is rotatable with respect to the hull and to the pipeline launch tower over at least 90°, wherein a rotation drive is provided to rotate the stinger support ring around a vertical axis, to allow for displacement of the stinger between the stinger operational position and a remote stinger non-active position which is remote from the firing line to allow the lowering of the accessory in the firing line by a lowering device.

27. The vessel according to claim 1, wherein the vessel is a twin hull semi-submersible vessel comprising:
a non-submerging structure, and
a submerging structure having two parallel hulls, the non-submerging structure being supported by columns located on the two parallel hulls, the non-submerging structure comprising a moonpool extending through the non-submerging structure,
wherein the pipeline launch tower is mounted at or above the moonpool, and
wherein the stinger, in an active stinger position, is located at a lower end of the moonpool.

28. A marine pipelaying vessel for laying pipe sections and an accessory into the sea, forming an offshore pipeline having a weight, the accessory having dimensions larger than a pipe section, the vessel being a semi-submersible vessel having a non-submerging structure and a submerging structure, the non-submerging structure being supported by the submerging structure, the non-submerging structure comprising a moonpool extending through the non-submerging structure, the vessel comprising:
a pipeline launch tower mounted at or above the moonpool to the non-submerging structure, the pipeline launch tower comprising pipe laying equipment defining a firing line in which the pipe sections provided with the accessory are launched into the sea to form the offshore pipeline, the pipe laying equipment including a lowering device adapted to lower the offshore pipeline;
a hang off module provided at a lower end of the pipeline launch tower, the hang off module being adapted to support the weight of the offshore pipeline, the hang off module being movable between a hang off operational position in the firing line and a non-active hang off position remote from the firing line;
an accessory handling system for positioning the accessory above the offshore pipeline suspended from the hang off module, wherein the accessory is to be connected to the offshore pipeline; and
a stinger supported at an upper end thereof by a stinger support assembly, the stinger support assembly including:
one or more guide tracks mounted on opposite sides of the lower end of the moonpool to the non-submerging structure of the vessel;
a stinger support member which is displaceable along the one or more guide tracks to allow for substantially horizontal displacement of the upper end of the stinger with respect to the pipeline launch tower, the stinger support member comprising two opposing pivot connections which define a horizontal pivot axis about which the stinger is pivotably supported, such that the stinger is pivotable up and down between an uppermost stinger position and a lowermost stinger position, the stinger support assembly being adapted to allow for displacement of the stinger with respect to the pipeline launch tower between a stinger operational position in which the stinger is adapted to guide the offshore pipeline generally below the hang off module in the firing line into the sea, and a remote stinger non-active position, in which the stinger pivots to an upward position and in which the stinger support member is displaced away from the pipeline launch tower, which is remote from the firing line, to allow the lowering of an accessory in the firing line.

\* \* \* \* \*